United States Patent
Babcock et al.

(10) Patent No.: US 10,558,970 B2
(45) Date of Patent: Feb. 11, 2020

(54) WHITE LABEL MERCHANT STORED VALUE ACCOUNT PEER LINKING AND FUNDING SYSTEM

(71) Applicant: PAYPAL, INC., San Jose, CA (US)

(72) Inventors: Patrick Babcock, San Jose, CA (US); Prashant Jamkhedkar, San Jose, CA (US); Aravindan Ranganathan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 281 days.

(21) Appl. No.: 15/794,594

(22) Filed: Oct. 26, 2017

(65) Prior Publication Data

US 2019/0130383 A1   May 2, 2019

(51) Int. Cl.
  *G06Q 20/32*   (2012.01)
  *G06Q 20/10*   (2012.01)

(52) U.S. Cl.
  CPC ......... *G06Q 20/3226* (2013.01); *G06Q 20/10* (2013.01)

(58) Field of Classification Search
  CPC .......................... G06Q 20/3226; G06Q 20/10
  See application file for complete search history.

(56) References Cited

U.S. PATENT DOCUMENTS

| | | | | |
|---|---|---|---|---|
| 6,253,998 B1 * | 7/2001 | Ziarno | .................. | A47G 33/00 235/380 |
| 2007/0272736 A1 * | 11/2007 | Brooks | .................. | G06Q 20/10 235/379 |
| 2008/0109319 A1 * | 5/2008 | Foss | ....................... | G06F 21/31 705/17 |

FOREIGN PATENT DOCUMENTS

WO   WO-2005038623 A2 *   4/2005   .......... G06Q 20/027

OTHER PUBLICATIONS

Grilli, Lou: Mobile P2P users in the U.S. grow from 69 million to 126 million by 2020, Jan. 12, 2017, The Payment Review, pp. 1-7. (Year: 2017).*

Rhine et al.: Stored Value Cards as a Method of Electronic Payment for Unbanked Consumers, Aug. 2015, Federal Reserve Bank of New York, pp. 1-30. (Year: 2015).*

* cited by examiner

*Primary Examiner* — Bijendra K Shrestha
(74) *Attorney, Agent, or Firm* — Haynes and Boone, LLP

(57) ABSTRACT

A white label merchant stored value account peer linking/funding system includes a payment service provider database storing associations between different merchants and respective groups of white label merchant stored value accounts. A payment service provider links, in the database, a first user identifier received from a first user device with a first white label merchant stored value account that is included in a first group of white label merchant stored value accounts that are associated with a first merchant in the database. The payment service provider device then receives second user identifiers from the first user device, and links each of the second user identifiers with the first white label merchant stored value account in the database. The payment service provider device then receives respective second user account information from the second user devices and funds the first white label merchant stored value account with respective first funding amounts.

20 Claims, 31 Drawing Sheets

WHITE LABEL MERCHANT STORED VALUE ACCOUNT PEER LINKING AND FUNDING SYSTEM

BACKGROUND

Field of the Disclosure

The present disclosure generally relates to online and/or mobile payments and more particularly to systems and methods for database linking of primary and peer users to allow novel funding solutions for white label merchant stored value accounts provided to a variety of different merchants.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

One method for making online and/or mobile payments is via the use of merchant stored value accounts. Merchant stored value accounts are merchant-specific payment accounts that are funded by the users that are to utilize those merchant stored value accounts, and are then used to make payments to the merchant that provides those merchant stored value accounts. However, conventional merchant stored value account systems require merchants to include the infrastructure that enables the set up and management of the merchant stored value accounts with users, which includes the merchant receiving, holding, and tracking funds sent by the users to their merchant stored value accounts, and used with the merchant. Furthermore, conventional merchant stored value account systems are limited to allowing the users of those merchant stored value accounts to fund their merchant stored value accounts via payment/funding accounts that they control, thus limiting the ability to fund those merchant stored value accounts in a variety of situations.

Thus, there is a need for an improved merchant stored value account system.

Figure 1:
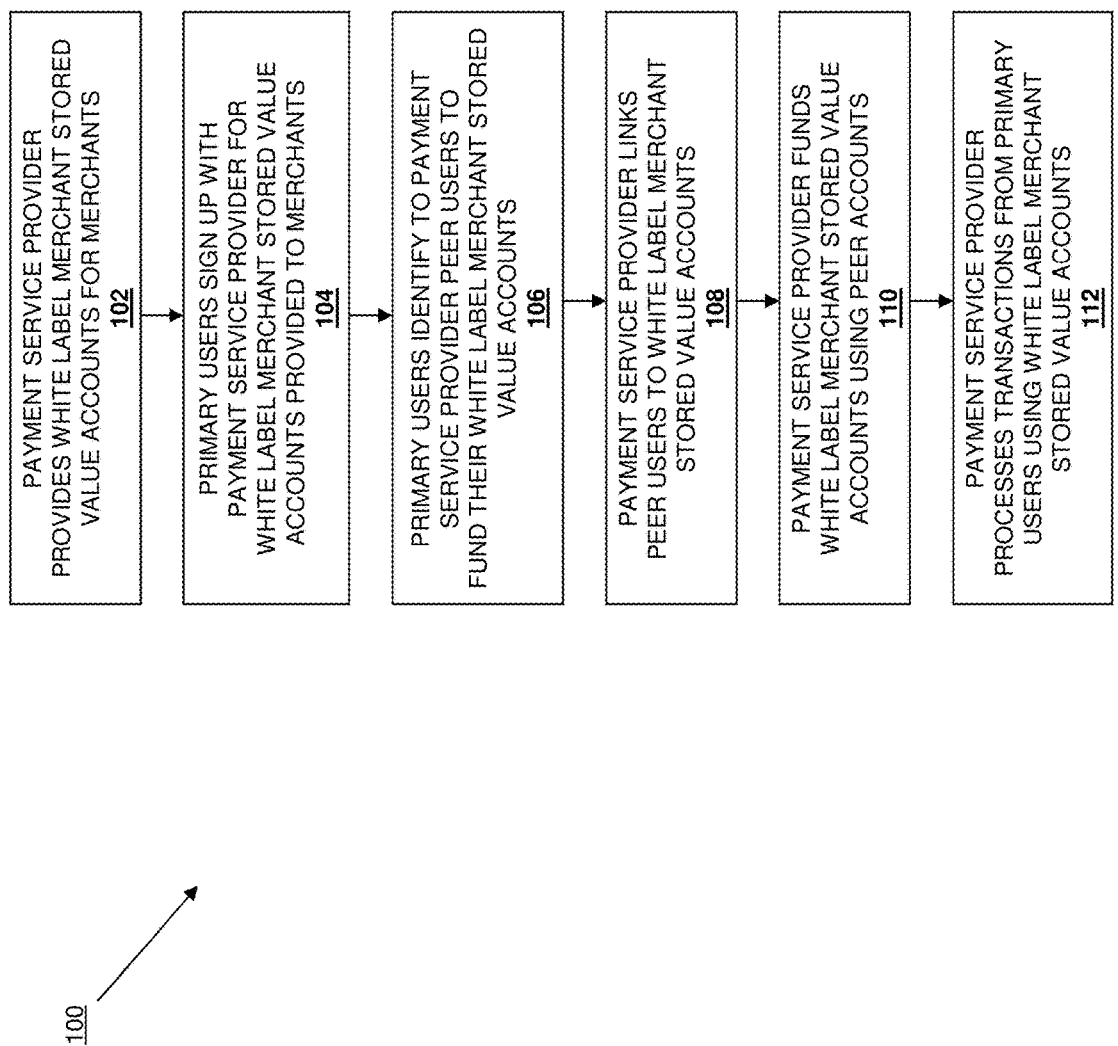
FIG. 1 is a flow chart illustrating an embodiment of a method for peer linking and funding of white label merchant stored value accounts.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for database primary/peer user linking and associated funding of white label merchant stored value accounts provided to a plurality of merchants by a payment service provider. In particular, the present disclosure addresses the technical problems associated with a payment service provider or other third party providing white label merchant stored value accounts to a plurality of different merchants, and then allowing primary users of those white label merchant stored value accounts to link peer users with their white label merchant stored value account in order to allow those peer users to fund their white label merchant stored value account. As such, the payment service provider provides for the offloading of the creation, tracking, and management of merchant stored value accounts from merchants, while providing for enhanced funding functionality of those merchant stored value accounts that results in an improvement to merchant stored value account technology. These and other benefits discussed below will be apparent to one of skill in the art in possession of the present disclosure.

Referring now to FIG. 1, a method 100 for peer linking and funding of a white label merchant stored value account is illustrated. In an embodiment of the method 100 discussed below, a payment service provider such as, for example, PayPal Inc. of San Jose, Calif., United States, provides conventional payment accounts to the users and merchants discussed below. For example, a conventional payment account provided by the payment service provider may be linked by the users or merchants with one or more of their financial/funding accounts (e.g., bank accounts, credit accounts, etc.) in order to fund those conventional payment accounts. Furthermore, the payment service provider may operate to provide wallet software for user devices utilized by the users and merchant devices utilized by the merchants, which may allow for the spending of funds in a conventional payment account and/or any of the financial accounts discussed above. While some conventional payment service provider functionality has been described above, one of skill in the art in possession of the present disclosure will recognize that payment service providers may perform a variety of other functionality that will remain within the scope of the present disclosure. Furthermore, in some embodiments, the payment service provider may be replaced by another type of third party that provides the white label merchant stored value accounts as discussed below.

In the discussions below the payment service provider operates a payment service provider device that may include one or more computing devices that are configured to perform the functionality described below, including the communication through the network (e.g., the Internet, a Local Area Network (LAN), and/or other network known in the art) with user devices utilized by users, merchant devices utilized by merchants, financial account provider devices utilized by financial account providers, and/or any other device operated by any other entity that operates the systems and performs the methods described below. In addition, the payment service provider device may include and/or be coupled to database(s) provided on storage device(s) that store information utilized in providing the functionality discussed below, including the linking of peer users to primary users and/or white label merchant stored value accounts that are controlled by those primary users. However, while specific hardware and software is discussed herein for providing the functionality of the present disclosure, one of skill in the art in possession of the present disclosure will recognize that the payment service provider device, user devices, merchant devices, and/or any other devices may include different device components and/or component configurations while remaining within the scope of the present disclosure.

The method 100 begins at block 102 where the payment service provider device provides white label merchant stored value accounts for merchants. In an embodiment, at block 102, the payment service provider device may operate to communicate with merchant devices utilized by different merchants in order to set up white label merchant stored value accounts for use by the customers (i.e., the primary users discussed below) of those merchants. As such, groups of white label merchant stored value accounts may be provided by the payment service provider to each of a plurality of different merchants. In some embodiments, a merchant may be a merchant associated with a single merchant physical location (e.g., a single restaurant) or a single merchant online location (e.g., a single online goods/services seller). However, in other embodiments, a merchant may be a merchant associated with multiple merchant physical locations (e.g., multiple restaurants) or multiple merchant online locations. Furthermore, in yet other embodiments, "merchant" as used below may include a plurality of merchants that sell similar goods (e.g., gas station merchants, online software merchants, etc.) and that cooperate to provide the white label merchant stored value accounts to users that wish to make purchases from any of those merchants. Thus, while a few specific examples are described herein, any of the plurality of merchants that are provided a group of white label stored value accounts by the payment service provider at block 102 may be defined in a variety of manners that will fall within the scope of the present disclosure.

Figure 2:
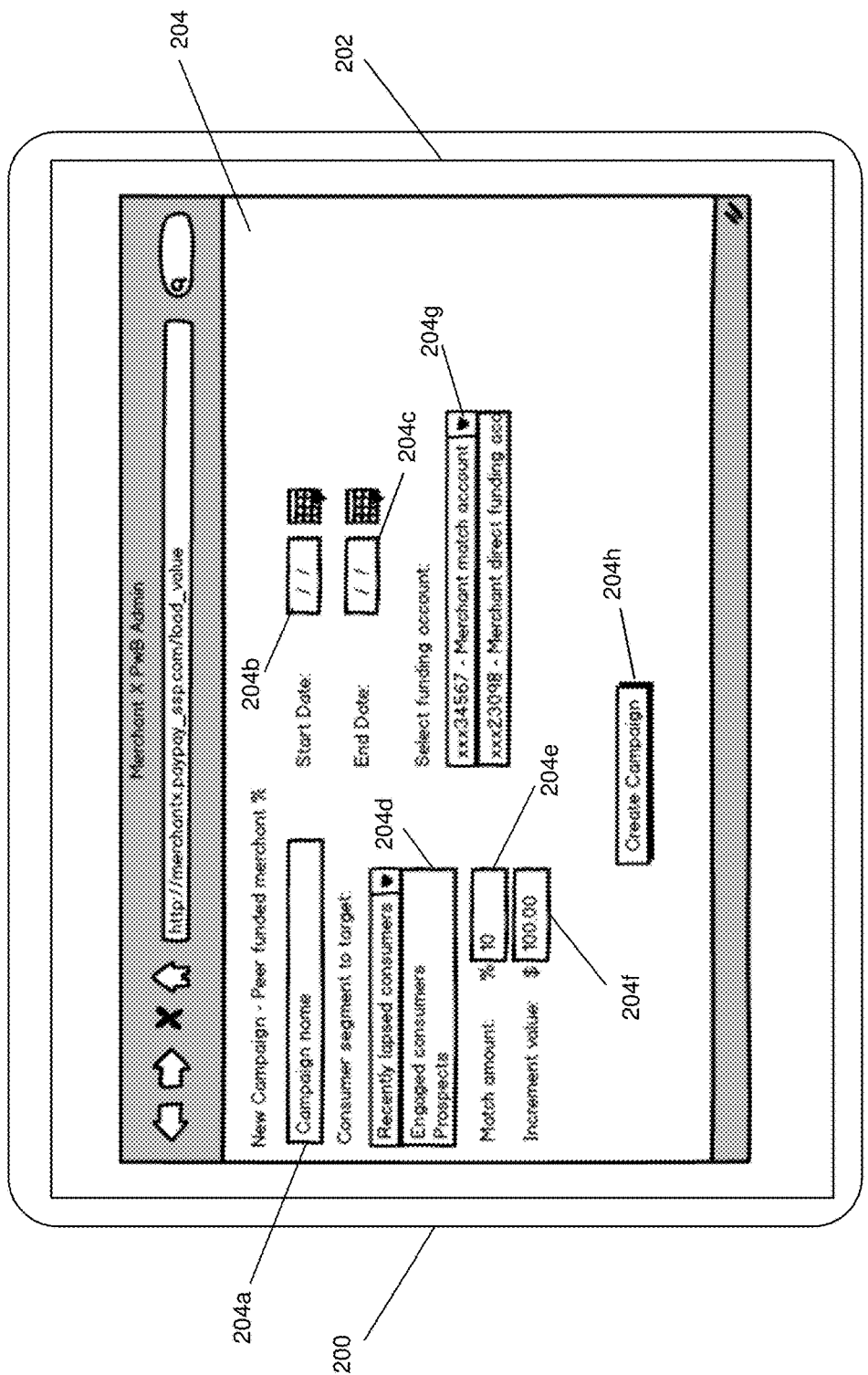
FIG. 2 is a screenshot view illustrating an embodiment of a merchant device displaying a white label merchant stored value setup page.

With reference to FIG. 2, a merchant device 200 with a display screen 202 is illustrated displaying a screenshot of a white label merchant stored value setup page 204 that may be provided through the network by the payment service provider device at block 102. In the illustrated embodiment, the white label merchant stored value setup page 204 allows the merchant utilizing the merchant device 200 to create white label merchant stored value accounts for use in a marketing campaign to its customers (i.e., the primary users discussed below), although the use of white label merchant stored value accounts in other contexts will fall within the scope of the present disclosure as well.

For example, the white label merchant stored value setup page 204 includes a campaign name input 204a that the merchant may use to name the marketing campaign or group of white label merchant stored value accounts, a campaign start date input 204b that the merchant may use to set a start date for the marketing campaign, a campaign end date input 204c that the merchant may use to set an end date for the marketing campaign, a customer targeting input 204d that the merchant may use to identify target customers (e.g., the primary users discussed below) for the white label stored value accounts offered in the marketing campaign, a match input 204e that the merchant may use to provide an matching funding amounts (or other incentives) for the white label stored value accounts offered in the marketing campaign, a maximum amount input 204e that the merchant may use to provide indicate an maximum amount that will be matched or incentivized for the white label stored value accounts offered in the marketing campaign, a merchant account information input that the merchant may use to provide merchant account information for a merchant account that is to be used with the white label stored value accounts offered in the marketing campaign (e.g., to provide the matching/incentive funding amounts discussed above), and a create campaign button 204h that the merchant may select to create the white label merchant stored valued accounts that will be associated with that merchant. While a specific setup page 204 has been illustrated and described, one of skill in the art in possession of the present disclosure will recognize that FIG. 2 provides a simplified example for the purposes of discussion below, and that white label merchant stored value account setup may require many pages and variety of information while remaining within the scope of the present disclosure. As such, at block 102, a plurality of different merchants may utilize merchant devices similar to the merchant device 202 to create white label merchant stored value accounts for use by their customers and/or the primary users discussed herein.

Figure 6A:
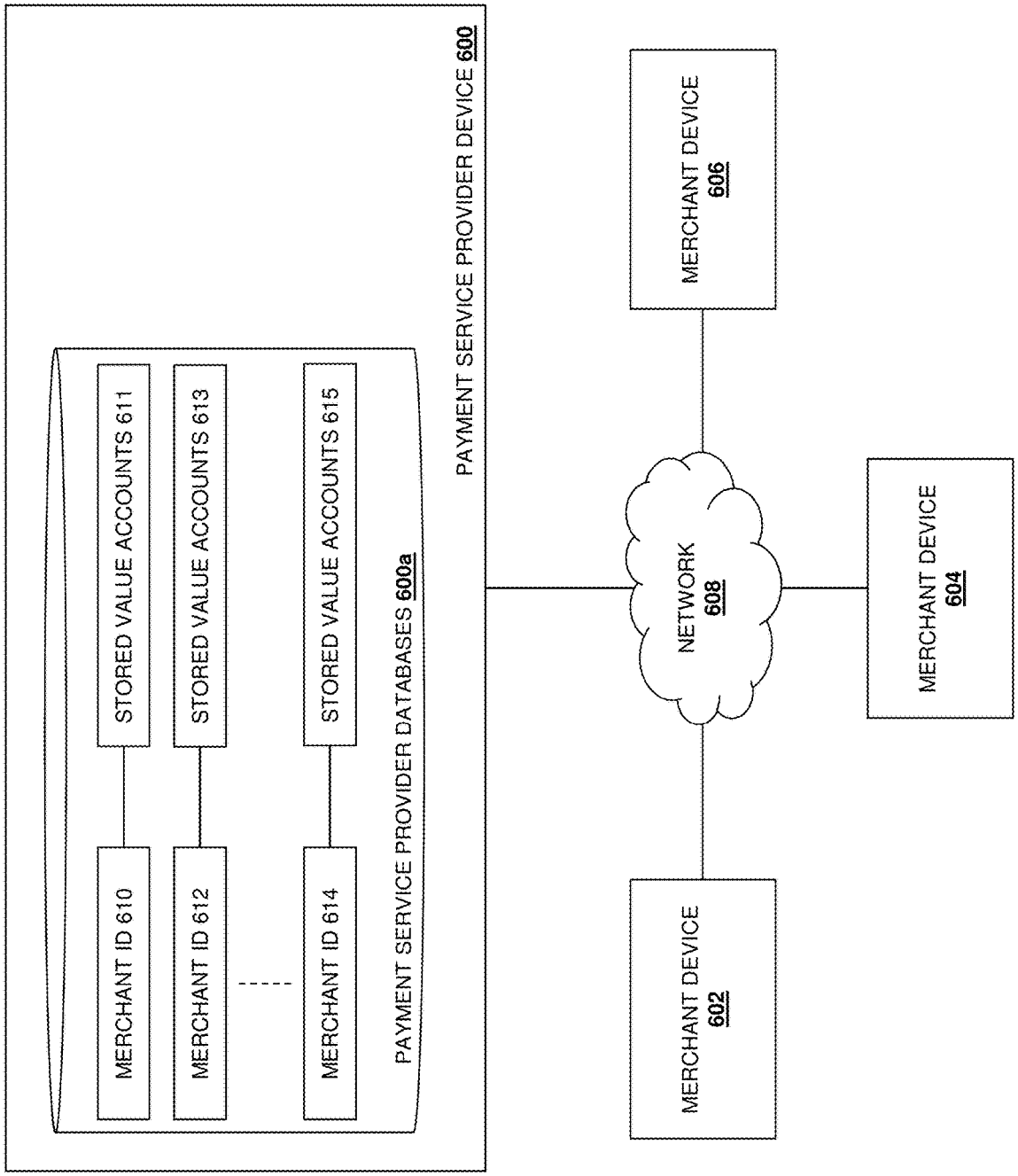
FIG. 6A is a schematic view illustrating an embodiment of a white label merchant stored value account peer linking system including a first level of merchant/account linking.

Referring now to FIG. 6A, an embodiment of a payment service provider device 600 coupled to merchant devices 602, 604, and 606 through a network 608 is illustrated. In particular, FIG. 6A illustrates how a payment service provider database 600a provides for the linking of merchants and groups of white label merchant stored value accounts provided by the payment service provider device. For example, a merchant identifier 610, along with any of a variety of other merchant information collected by the payment service provider device, is linked with a plurality of white label merchant stored value accounts 610a in the payment service provider database 600a. Similarly, a merchant identifier 612 is linked with a plurality of white label merchant stored value accounts 612a in the payment service provider database 600a, and a merchant identifier 614 is linked with a plurality of white label merchant stored value accounts 614a in the payment service provider database 600a. As discussed in further detail below, FIG. 6A illustrates a first level of database linking (i.e., between merchants and white label merchant stored value accounts) that provides for the primary/peer user linking and funding of white label merchant stored value accounts provided by the payment service provider device to a plurality of different merchants.

Referring back to FIG. 1, the method 100 then proceeds to block 104 where primary user devices sign up with the payment service provider device for white label merchant stored value accounts that are provided to merchants. In an embodiment, at block 104, primary user devices utilized by primary users may be used to communicate with the payment service provider device to sign up for white label stored value accounts that are provided by the payment service provider device for any of a plurality of merchants. For example, at block 104 the payment service provider device may communicate through the network with a first primary user device about a first white label stored value account provided for a first merchant, receive a first primary user identifier (as well as a variety of other primary user information that may be collected by the payment service provider device as discussed below), and then link that first primary user identifier (as well as other primary user information) with the first white label merchant stored value account provided for the first merchant. Similarly, at block 104 the payment service provider device may also communicate through the network with a second primary user device about a second white label stored value account provided for the first merchant, receive a second primary user identifier, and then link that second primary user identifier with the second white label merchant stored value account provided for the for the first merchant. As such, any number of primary users may be linked to white label merchant stored value account provided for any merchants by the payment service provider device similarly as described above for the first merchant.

In some examples, at block 104 the payment service provider device may communicate through the network with any primary user device to receive primary user account information, and then use that primary user account information to fund the white label merchant stored value account linked to the primary user identifier received from that primary user device. As such, any primary users may utilize primary user funding account information to fund white label merchant stored value accounts provided for any merchants by the payment service provider device.

Figure 3A:
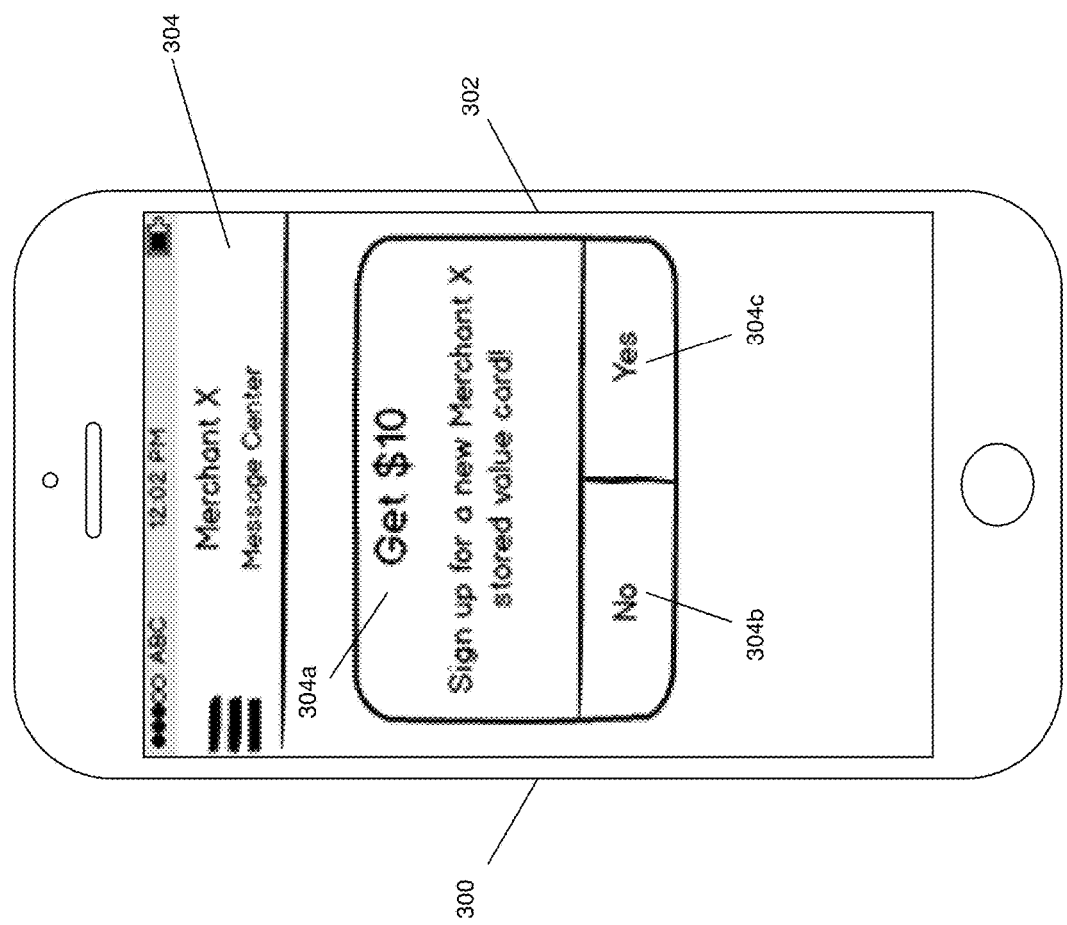
FIG. 3A is a screen shot illustrating an embodiment of a user device displaying a white label merchant stored value incentive page.

With reference to FIGS. 3A-3E, a primary user device 300 with a display screen 302 is illustrated displaying screenshots of white label merchant account creation and funding pages that may be provided through the network by the payment service provider device at block 104. FIG. 3A illustrates an example of a screen shot of a white label merchant stored value incentive page 304 that may be provided for display on the primary user device 300 accessing a merchant application provided by the merchant. As such, the primary user of the primary user device 300 may launch a merchant application on the primary user device 300 and, in response, the merchant application may determine that the white label merchant stored value incentive page 304 should be displayed to the primary user (e.g., because the primary user is a customer identified for targeting in the marketing campaign described above with reference to FIG. 2). In the illustrated example, the white label merchant stored value incentive page 304 is provided by a pop-up message (e.g., displayed via the merchant application) that identifies a white label merchant stored value account incentive 304a (e.g., $10 for signing up for the white label merchant stored value account) or other matching offer (discussed above with reference to FIG. 2), along with a decline button 304b and an accept button 304c. As such, the primary user may select the decline button 304b to decline the white label merchant stored value account incentive 304a, or select the accept button 304c to accept the white label merchant stored value account incentive 304a.

Figure 3B:
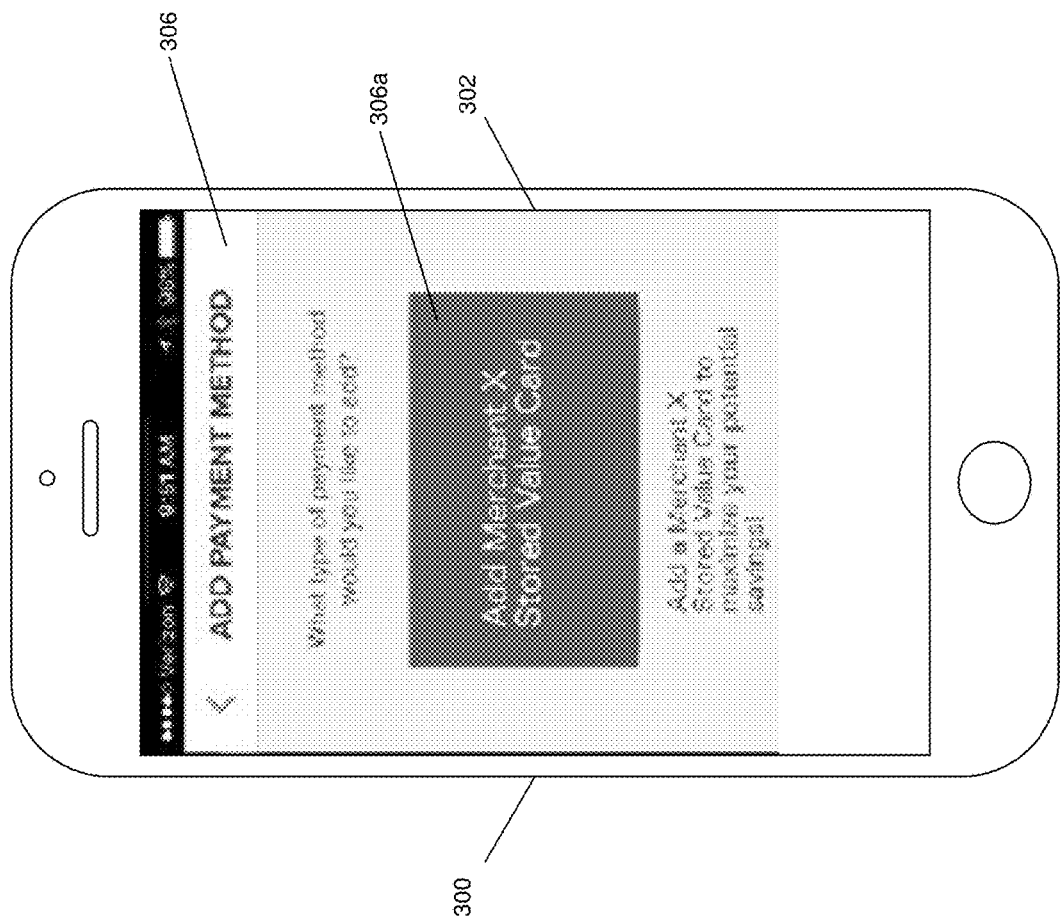
FIG. 3B is a screen shot illustrating an embodiment of a user device displaying a white label merchant stored value account adding page.

FIG. 3B illustrates an example of a screen shot of a white label merchant stored value account adding page 306 that may be provided for display on the primary user device 300 in response to the primary user selecting the accept button 304c on the white label merchant stored value incentive page 304. The white label merchant stored value account adding page 306 provides a white label merchant stored value account add button 306a that the primary user may select to provide an indication of the desire to add a white label merchant stored value account as, for example, one of their payment methods in the merchant application running on the primary user device 300.

Figure 3C:
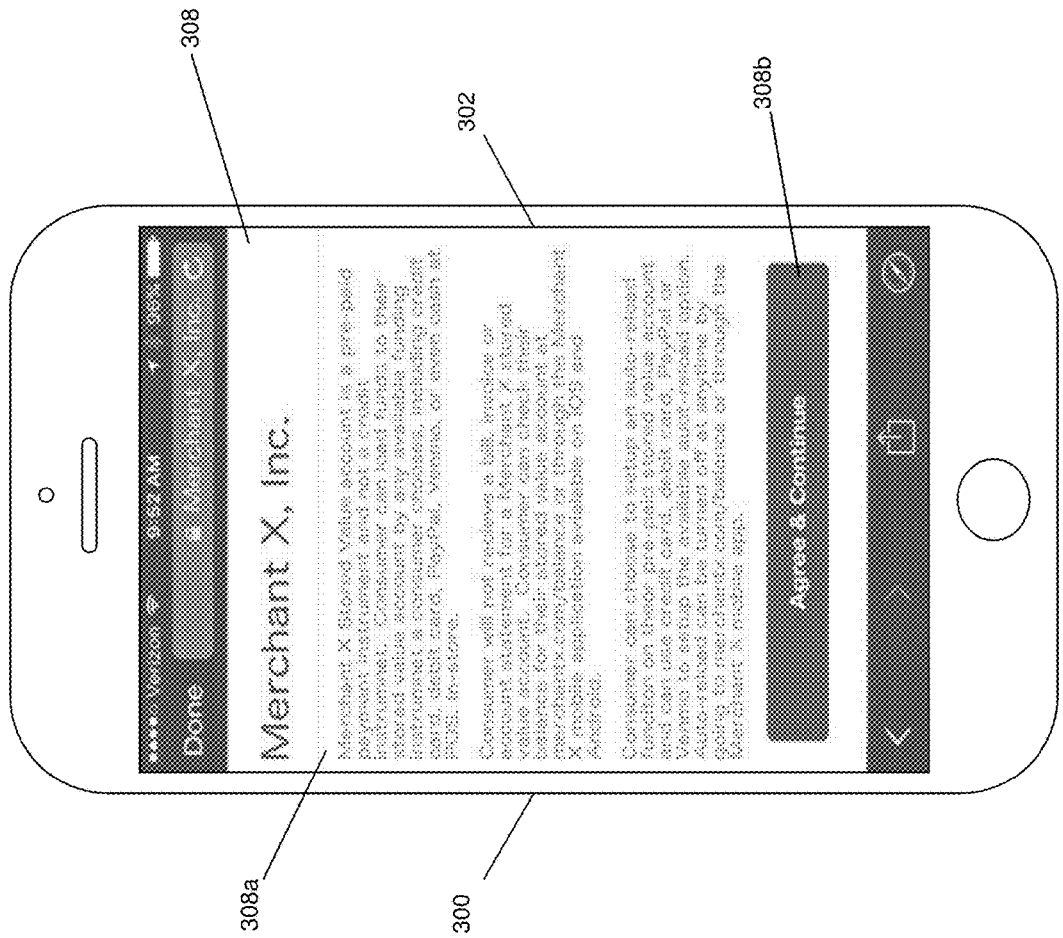
FIG. 3C is a screen shot illustrating an embodiment of a user device displaying a white label merchant stored value account conditions page.

FIG. 3C illustrates an example of a screen shot of a white label merchant stored value account conditions page 308 that may be provided for display on the primary user device 300 in response to the primary user selecting the white label merchant stored value account add button 306a on the white label merchant stored value account adding page 306. The white label merchant stored value account conditions page 308 provides a white label merchant stored value account information/disclosures section 308a that discloses the terms and conditions for the white label merchant stored value account, and an agree/continue button 308b that the primary user may select to confirm a desire to add a white label merchant stored value account as, for example, one of their payment methods in the merchant application provided on the primary user device 300.

Figure 3D:
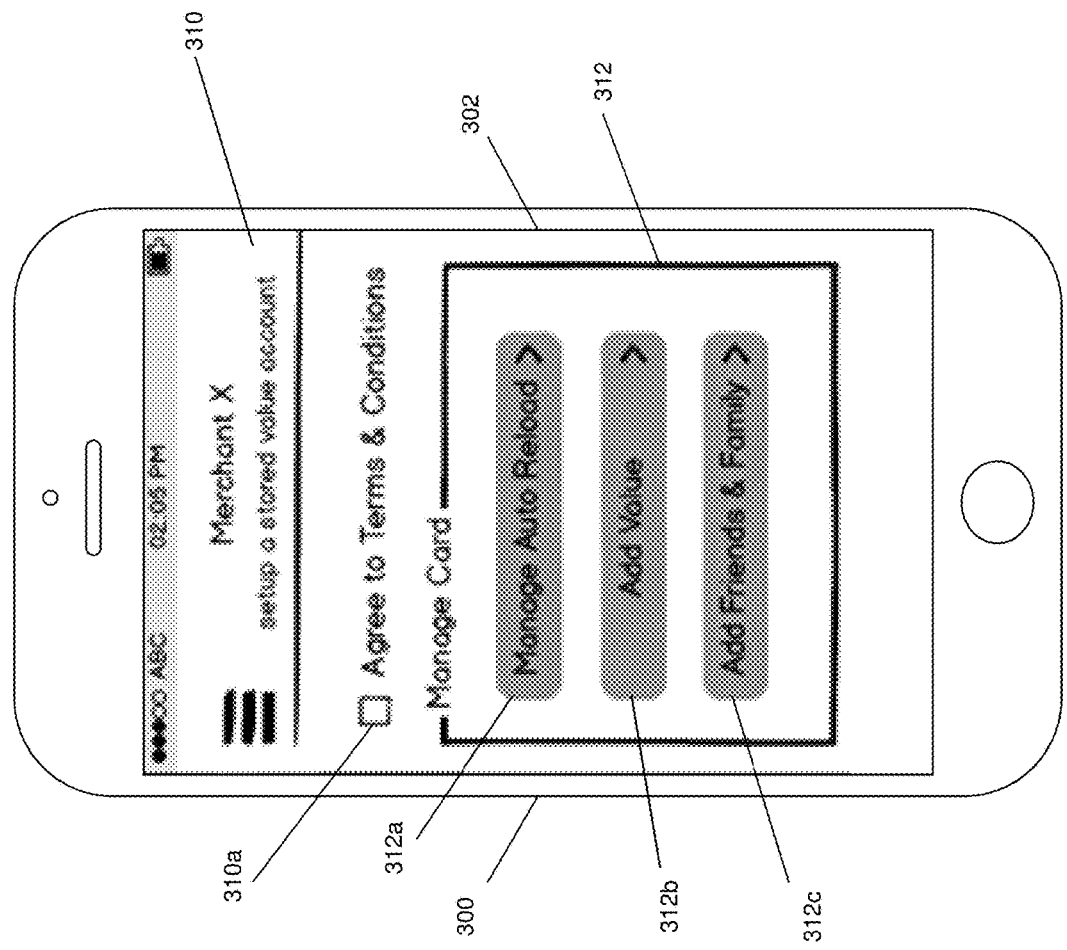
FIG. 3D is a screen shot illustrating an embodiment of a user device displaying a white label merchant stored value account funding selection page.

FIG. 3D illustrates an example of a screen shot of a white label merchant stored value account funding selection page 310 that may be provided for display on the primary user device 300 in response to the primary user selecting the agree/continue button 308b on the white label merchant stored value account conditions page 308. The white label merchant stored value account funding selection page 310 includes an agree selector 310a that the primary user may select to confirm that they agree with the terms and conditions of the white label merchant stored value account, along with a card management section 312 that includes an auto-reload management button 312a that the primary user may select to manage automatic fund "reload" instructions for automatically funding the white label merchant stored value account (e.g., using a funding account of the primary user, discussed above), an add value button 312b that the primary user may select to add funds to the white label merchant stored value account (e.g., using a funding account of the primary user, discussed above), and an add friends/family button 312c that the primary user may select to link peer users to the white label merchant stored value account, discussed in further detail below.

Figure 3E:
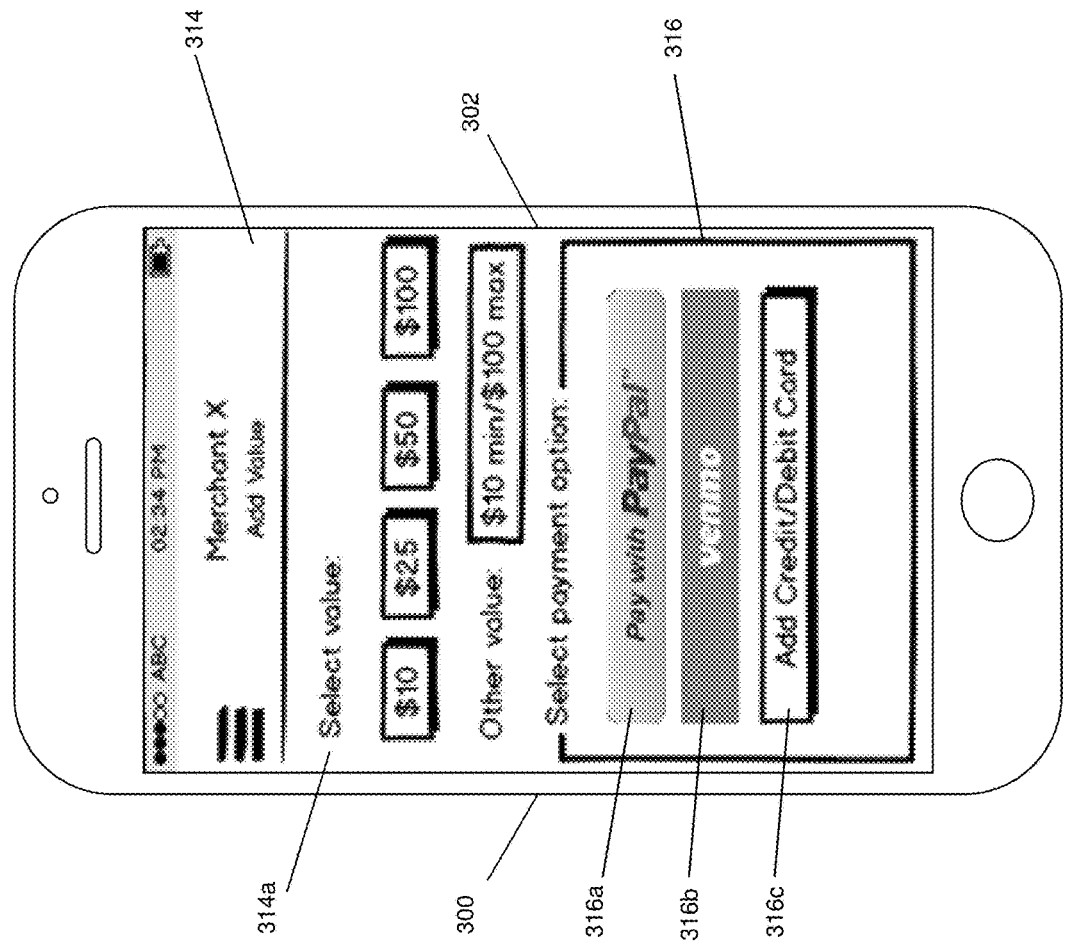
FIG. 3E is a screen shot illustrating an embodiment of a user device displaying a white label merchant stored value account funding page.

FIG. 3E illustrates an example of a screen shot of a white label merchant stored value account funding page 314 that may be provided for display on the primary user device 300 in response to the primary user selecting the add value button 312b on the white label merchant stored value account funding selection page 310. The white label merchant stored value account funding page 314 includes a value selector section 314a that the primary user may use to select a value to fund the white label merchant stored value account with, and includes a plurality of predetermined value amounts ("$10", "$25", "$50", and $100") as well as an input box for providing a custom or non-predetermined value amount. The white label merchant stored value account funding page 314 also includes a primary user account section 316 that includes account selectors 316a and 316b that the primary user may select to provide instructions to use the selected primary user account to fund the white label merchant stored value account with the amount designated in the value selector section 314a, an add account button 316c that the primary user may select to provide primary user account information to link a primary user funding account to the white label merchant stored value account for the purposes of funding the white label merchant stored value account.

Figure 7:
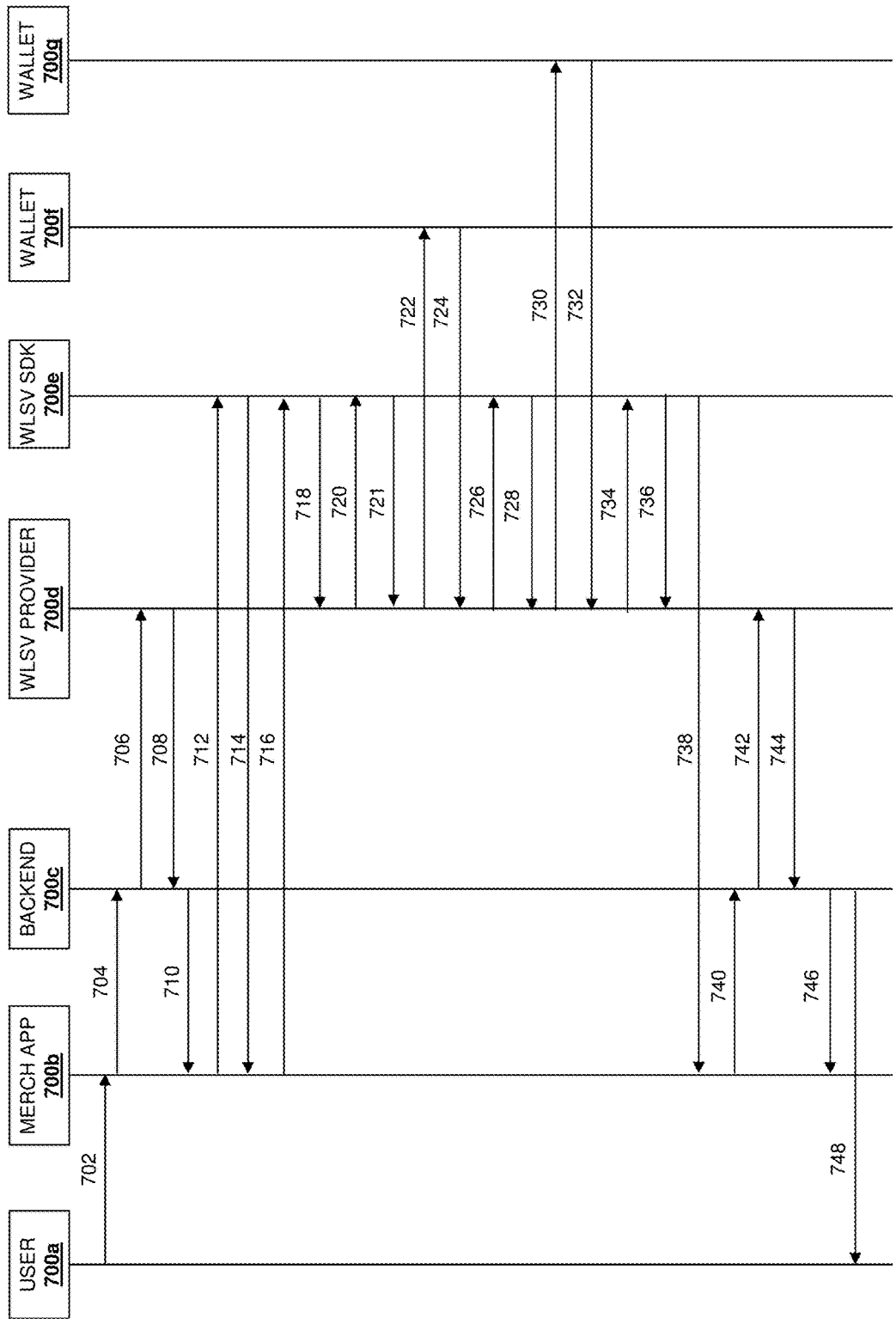
FIG. 7 is a swim lane diagram illustrating an embodiment of a method for creating a white label merchant stored value account.

With reference to FIG. 7, a swim lane diagram 700 illustrates an example of the creation of a white label merchant stored value account at block 104, and in particular describes the communications and/or functionality that is performed between a user 700a, a merchant application 700b, an application backend 700c, a white label stored value provider 700d, a white label stored value (WLSV) Software Development Kit (SDK) 700e, a wallet provider 700f, and a wallet provider 700g. As can be seen, the user 700a uses the merchant application 700b to add the white label stored value card by, for example, sending an instruction at 702 to add the stored value card/account for the merchant, which results in the sending of an add-stored-value-account instruction 704 from the merchant application 700b to the application backend 700c. The application backend 700c may then request a token from the WLSV provider 700d at 706, receive that token back from the WLSV provider 700d at 708, and provide that token to the merchant application 700b at 710. The merchant application 700b then collects and send device related data to the WLSV provider at 712 for fraud analysis, which triggers a consent/agreement flow between the merchant application 700b and the WLSV SDK 700e at 714 and 716 to add the stored value card/account. As part of that consent/agreement flow, the WLSV SDK 700e may provide the merchant application a Card Merchant Identifier (CMID) at 714, and there may be several options to fund the stored value card/account. As discussed herein, the funding options may include funding via friends and family and/or basic credit and/or debit cards, as well as funding via the wallet providers 700f and 700g.

For example, at 718 and 720 the WLSV provider 700d and WLSV SDK 700e may communicate to add a friend/family as a funding option; at 721, 722, 724, and 726, the WLSV provider 700d, WLSV SDK 700e, and wallet provider 700f may communicate to add the wallet provider 700f as a funding option; at 728, 730, 732, and 734, the WLSV provider 700d, WLSV SDK 700e, and wallet provider 700g may communicate to add the wallet provider 700g as a funding option; and at 736 the WLSV provider 700d and WLSV SDK 700e may communicate to add a credit card or bank account as a funding option. At 738, the WLSV SDK 700e provides a payment method nonce to the merchant application 700b, and at 740 the merchant application 700b may provide that payment method nonce and the CMID to the application backend 700c. The application backend 700c then provides the payment method nonce and the CMID to the WLSV provider 700d at 742, and at 744 the WLSV provider 700d provides a stored value payment method token to the application backend 700c in response, with that stored value payment method token persisting with the application backend 700c. At 746 the application backend 700c adds the stored value account to the merchant application 700b, and at 748 the merchant application informs the user 700a that the adding of the stored value account is successful.

Figure 6B:
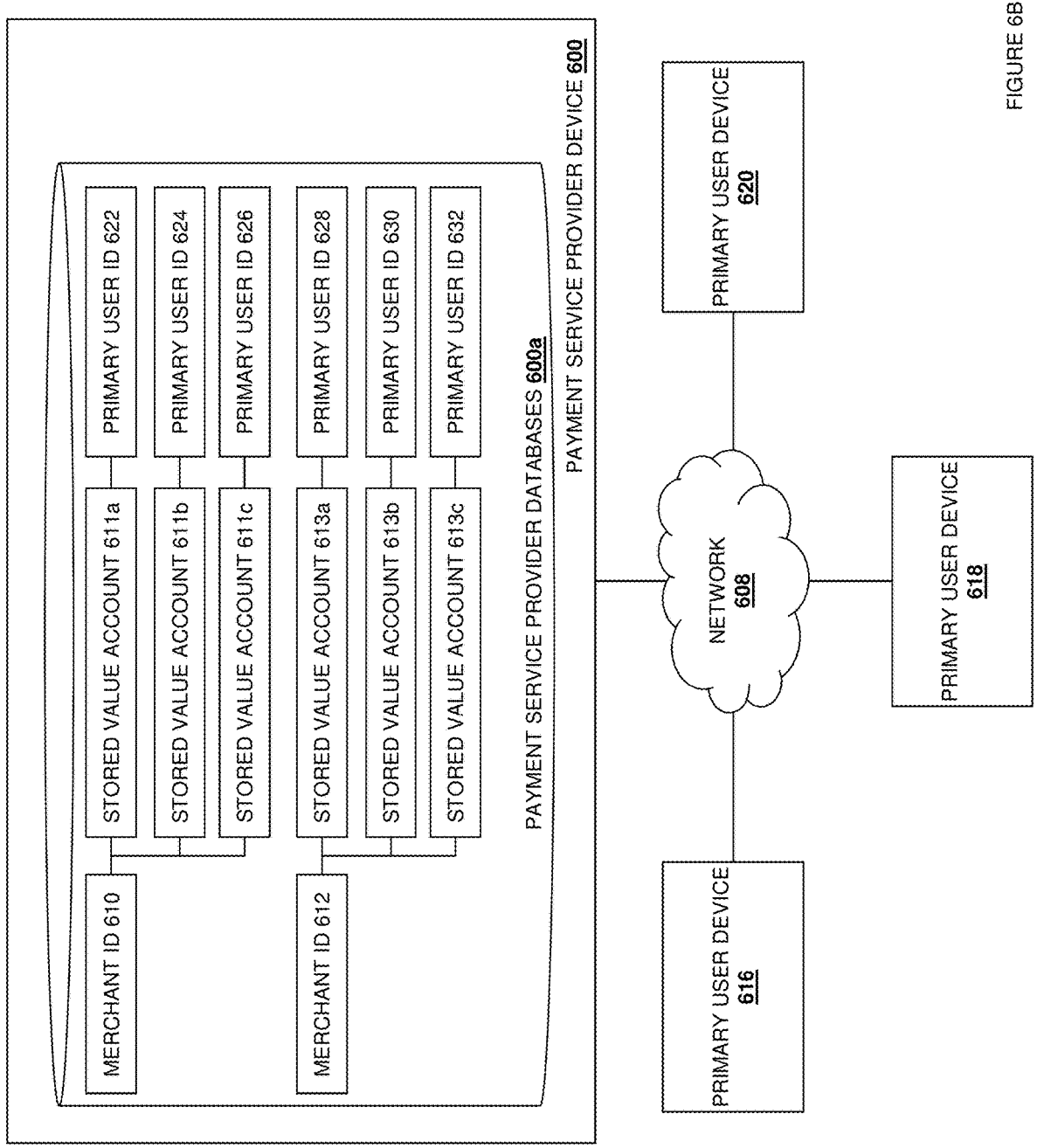
FIG. 6B is a schematic view illustrating an embodiment of a white label merchant stored value account peer linking system including a second level of primary user/account linking.

Referring now to FIG. 6B, an embodiment of the payment service provider device 600 coupled to primary user devices 610, 618, and 620 through the network 608 is illustrated. In particular, FIG. 6B illustrates how a payment service provider database 600a links the groups of white label merchant stored value accounts provided by the payment service provider device to the merchants (discussed above with reference to FIG. 6A) with primary user identifiers (and other primary user information) to link primary users with each of those white label merchant stored value accounts. For example, a primary user identifier 622 is linked in the payment service provider database 600a with a white label merchant stored value account 611a provided to a merchant (identified by the merchant identifier 610) by the payment service provider device 600, a primary user identifier 624 is linked in the payment service provider database 600a with a white label merchant stored value account 611b provided to a merchant (identified by the merchant identifier 610) by the payment service provider device 600, and a primary user identifier 626 is linked in the payment service provider database 600a with a white label merchant stored value account 611c provided to a merchant (identified by the merchant identifier 610) by the payment service provider device 600.

In addition, a primary user identifier 628 is linked in the payment service provider database 600a with a white label merchant stored value account 613a provided to a merchant (identified by the merchant identifier 612) by the payment service provider device 600, a primary user identifier 630 is linked in the payment service provider database 600a with a white label merchant stored value account 613b provided to a merchant (identified by the merchant identifier 612) by the payment service provider device 600, and a primary user identifier 632 is linked in the payment service provider database 600a with a white label merchant stored value account 613c provided to a merchant (identified by the merchant identifier 612) by the payment service provider device 600. One of skill in the art in possession of the present disclosure will recognize that any number of merchant may have their associated white label merchant stored value accounts linked with primary user identifiers in a similar manner. As discussed in further detail below, FIG. 6B illustrates a second level of database linking (i.e., between primary users and white label merchant stored value accounts provided to different merchants) that provides for the peer linking and funding of white label merchant stored value accounts provided by the payment service provider device to a plurality of different merchants.

Figure 6C:
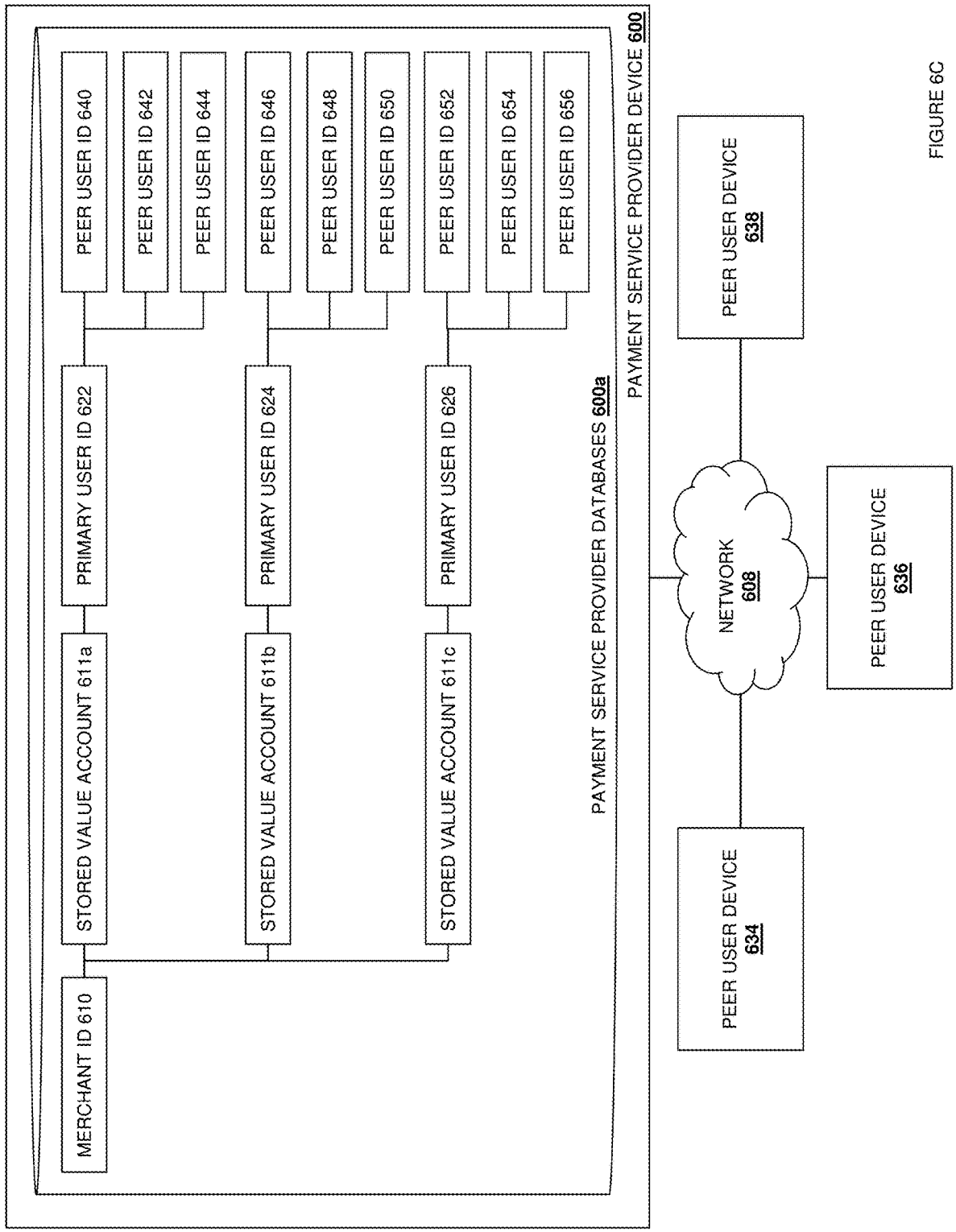
FIG. 6C is a schematic view illustrating an embodiment of a white label merchant stored value account peer linking system including a third level of peer user/primary user/account linking.
Figure 6D:
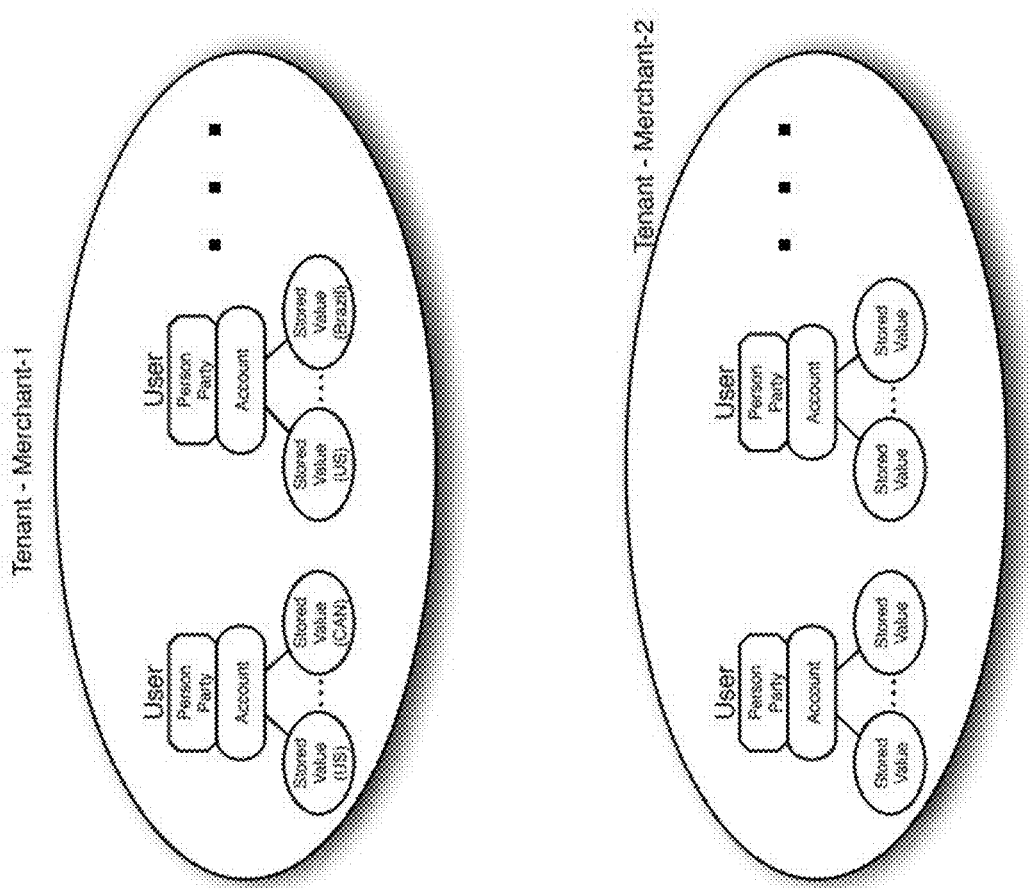
FIG. 6D is a schematic view illustrating an embodiment of merchant/tenant modeling for users and stored value accounts.

Referring now to FIG. 6D, the modeling of country-specific white label merchant stored value accounts and merchant/tenants is illustrated. As can be seen, "Tenant— Merchant 1" may be associated with a plurality of users, each of which has an associated account that may include a variety of different stored values that may be country specific. As such, any of the merchants may be on-boarded to the system as the merchants/tenants illustrated in FIG. 6D, and a user may create a white label merchant stored value account with that merchant/tenant as described herein, in order to provide country/region specific stored value with merchant/tenants, each of which has its own user/stored value account relationships.

Referring back to FIG. 1, the method 100 then proceeds to block 106 where the primary user devices identify (to the payment service provider device) peer users to fund their white label merchant stored value accounts. In an embodiment, at block 106 and subsequent to associating the primary users with a white label merchant stored value account provided to a merchant, the payment service provider device may operate to allow the primary user to identify peer users for funding that white label merchant stored value account. For example, the payment service provider device may utilize a payment application included on the primary user device, and/or a merchant application provided on the primary user device, to provide for peer user linking with the primary users and/or white label merchant stored value account provided to those primary users. Furthermore, in some embodiments, at block 106 the payment service provider device may operate to incentivize the primary user to link peer users to the white label merchant stored value account, either along or in cooperation with the merchant, as well as incentive the peer users to fund the white label merchant stored value accounts provided to the primary users.

Figure 3F:
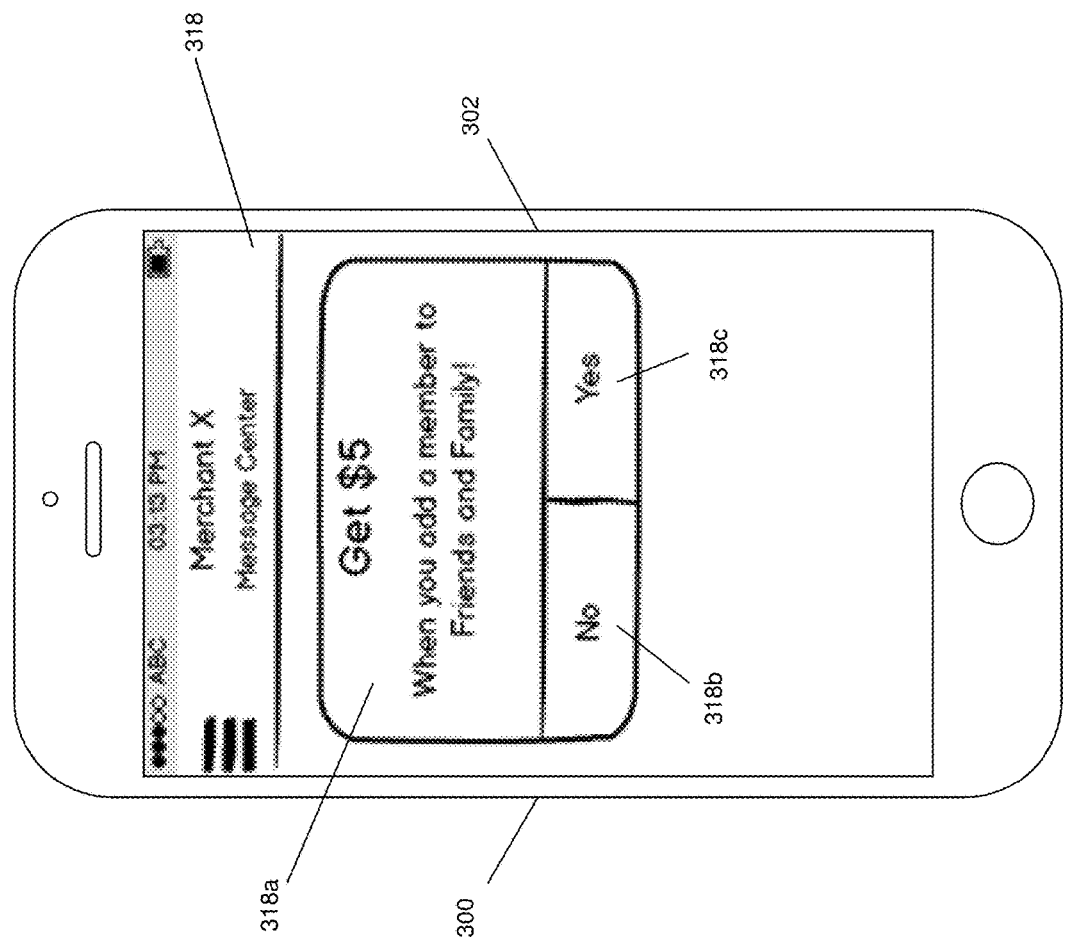
FIG. 3F is a screen shot illustrating an embodiment of a user device displaying a white label merchant stored value account peer adding incentive page.
Figure 3G:
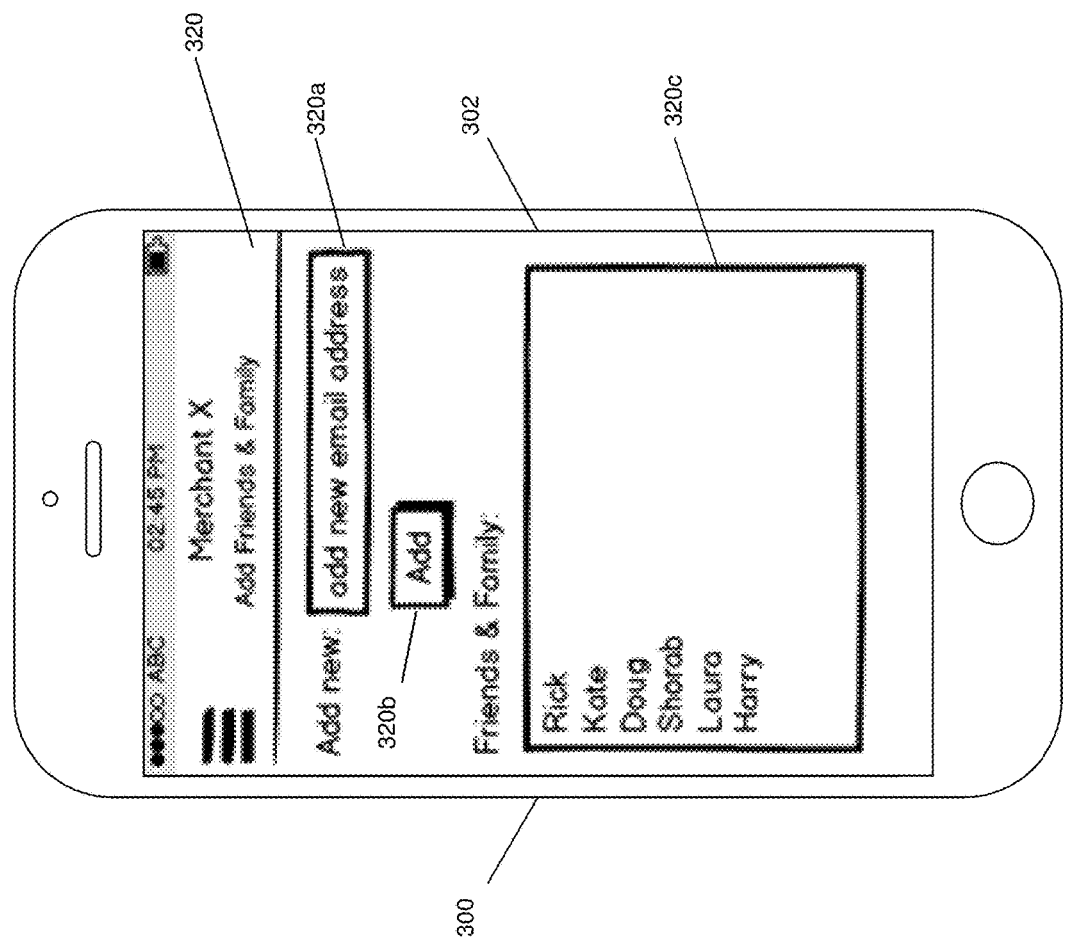
FIG. 3G is a screen shot illustrating an embodiment of a user device displaying a white label merchant stored value account peer adding page.

With reference to FIGS. 3F and 3G, the primary user device 300 is illustrated displaying a screenshot of white label merchant account peer linking pages that may be provided through the network by the payment service provider device at block 106. For example, FIG. 3F is a screen shot illustrating an embodiment of the primary user device 300 displaying a white label merchant stored value account peer adding incentive page 318 that may be provided for display on the primary user device 300 subsequent to the primary user signing up for the white label merchant stored value account. As such, the payment service provider device and/or the merchant application may determine that the primary user has signed up for the white label merchant stored value account, and that the white label merchant stored value account peer adding incentive page 318 should be displayed to the primary user (e.g., because the primary user is a customer identified for targeting with the marketing campaign described above with reference to FIG. 2). In the illustrated example, the white label merchant stored value account peer adding incentive page 318 is provided by a pop-up message (e.g., displayed via the merchant application) that identifies a white label merchant stored value account peer adding incentive 318a (e.g., $5 for adding peer users to the white label merchant stored value account), along with a decline button 318b and an accept button 318c. As such, the primary user may select the decline button 304b to decline the white label merchant stored value account peer adding incentive 318a, or select the accept button 318c to accept the white label merchant stored value account peer adding incentive 318a FIG. 3G is a screen shot illustrating an embodiment of the primary user device 300 displaying a white label merchant stored value account peer adding page 320 in response to the primary user selecting the accept button 318c on the white label merchant stored value account peer adding incentive page 318. The white label merchant stored value account peer adding page 320 provides a peer user identifier input 320a that the primary user may use to provide peer user identifiers (e.g., the email addresses in the illustrated embodiment, although phone numbers and/or other identifiers will fall within the scope of the present disclosure as well), an add button 320b that the primary user may select to submit a peer user identifier to the payment service provider device for adding the white label merchant stored value account, and a linked peer user identifier list 320c that identifies peer users that have been linked (or that have been submitted for linking) to the white label merchant stored value account. While peer user identifiers such as email addresses and phone numbers have been described above, other techniques for capturing peer user identifiers may be utilized while remaining within the scope of the present disclosure. For example, the primary user device 300 may include a camera that is configured to capture a Quick Response (QR) code displayed on a peer user device (discussed below), and the primary user device 300 may then decode that QR code to retrieve a peer user identifier for linking to the white label merchant stored value account, and send that peer user identifier to the payment service provider device to perform the database linking discussed below.

Referring back to FIG. 1, the method 100 then proceeds to block 108 where the payment service provider device links the peer users to white label merchant stored value accounts. In an embodiment, at block 108, the payment service provider device operates to utilize the peer user identifiers received from the primary user device at block 106 to communicate with peer user devices associated with those peer user identifiers, and may subsequently link their associated peer users to the white label merchant stored value account provided to the primary user. For example, the payment service provider device may use the email addresses, phone numbers, information decoded from a QR code, and/or any other peer identifier provided by the primary user device at block 106, to send a communication to a peer user device to notify the peer user device that the primary user would like to link them to their white label merchant stored value account, and then provide for the linking of that peer user to that white label merchant stored value account if that peer user agrees.

Figure 4A:
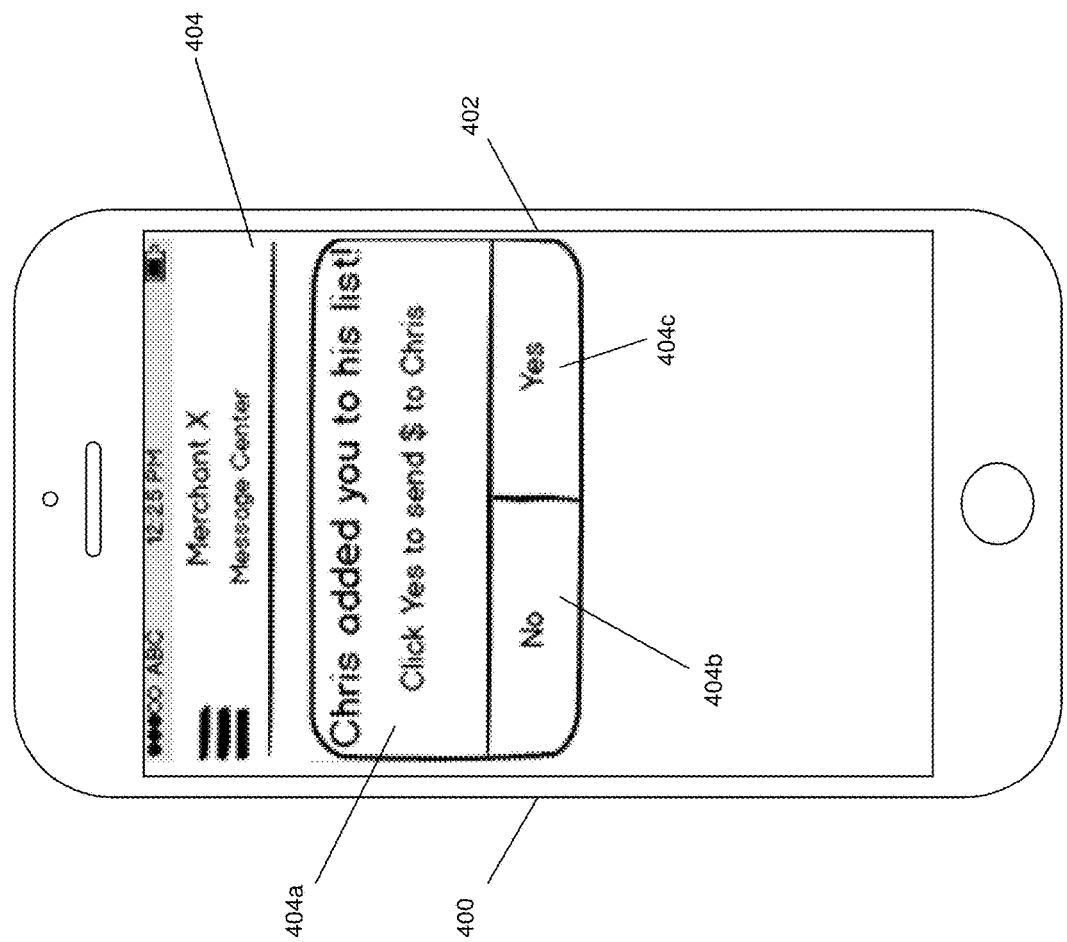
FIG. 4A is a screen shot illustrating an embodiment of a user device displaying a white label merchant stored value peer added alert page.
Figure 4B:
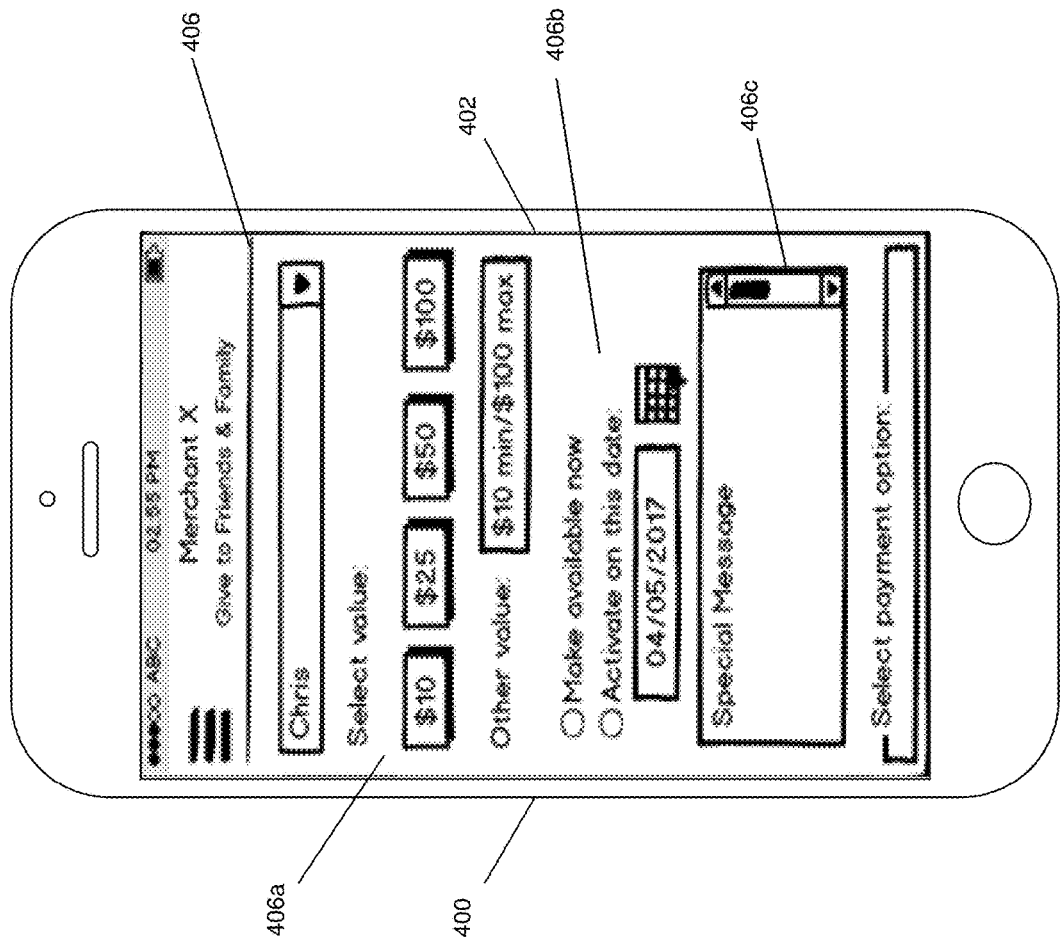
FIG. 4B is a screen shot illustrating an embodiment of a user device displaying a white label merchant stored value peer funding page.
Figure 4C:
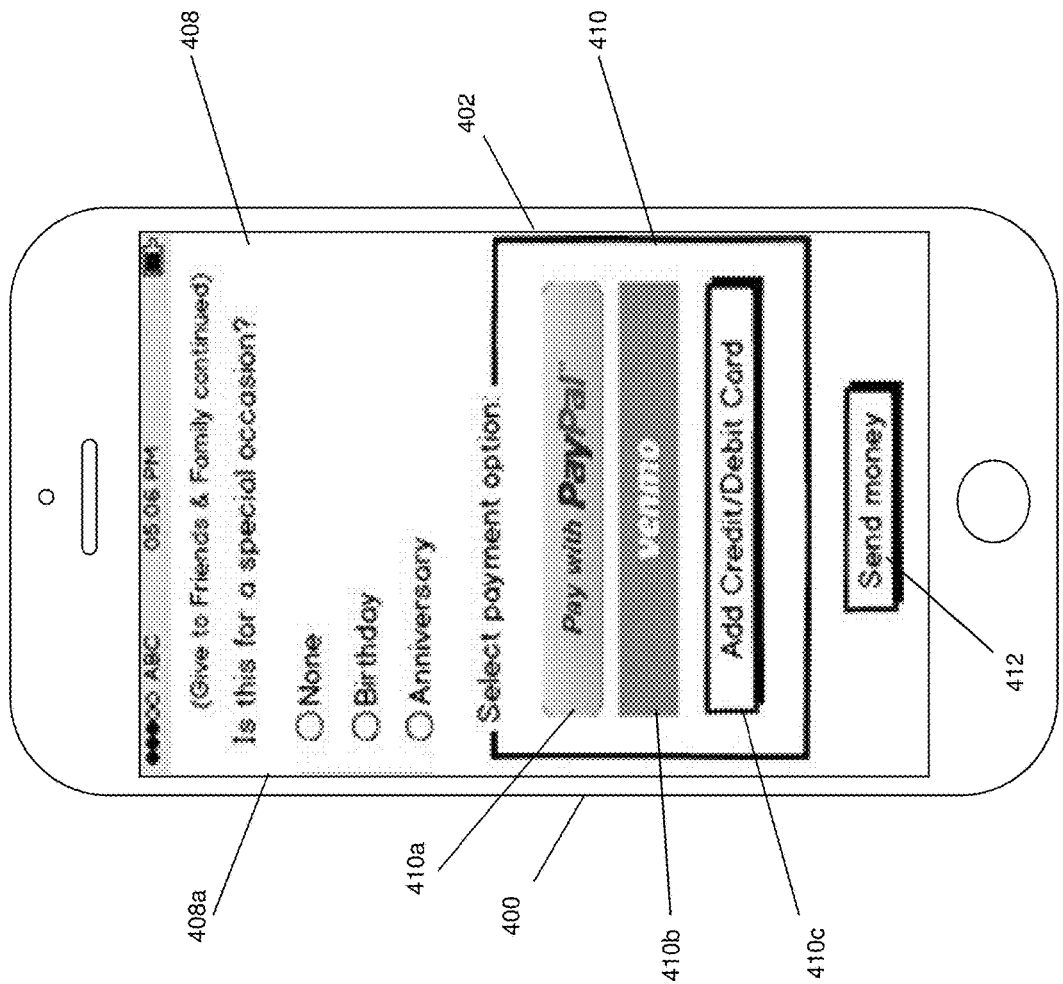
FIG. 4C is a screen shot illustrating an embodiment of a user device displaying a white label merchant stored value peer funding page.

With reference to FIGS. 4A-4C, a peer user device 400 is illustrated including a display screen 402 displaying screenshots of white label merchant account linking and funding pages that may be provided through the network by the payment service provider device at block 108. For example, FIG. 4A is a screen shot illustrating an embodiment of the peer user device 400 displaying a white label merchant stored value peer added alert page 404 that may be provided for display on the peer user device 400 accessing a payment application provided by the payment service provider device. As such, the peer user of the peer user device 400 may launch a payment application on the peer user device 400 and, in response, the payment application may determine that the white label merchant stored value peer added alert page 404 should be displayed to the peer user (e.g., because the peer user was identified by the primary user at block 106). In the illustrated example, the white label merchant stored value peer added alert page 404 is provided by a pop-up message (e.g., displayed via the payment application) that includes a peer added alert 404a that informs the peer user that the primary user is requesting to link the peer user to their white label merchant stored value account, along with a decline button 404b and an accept button 404c. As such, the peer user may select the decline button 404b to decline the request to be linked to the white label merchant stored value account of the primary user, or select the accept button 404c to accept the request to be added to the white label merchant stored value account of the primary user.

FIG. 4B illustrates an example of the peer user device 400 displaying a white label merchant stored value peer funding page 406 that may be provided for display on the peer user device 400 in response to the peer user selecting the accept button 404c on the white label merchant stored value peer added alert page 404. The white label merchant stored value peer funding page 406 may identify the primary user (e.g., "Chris"), includes a value selector section 406a that the peer user may use to select a value to fund the white label merchant stored value account of the primary user, and includes a plurality of predetermined value amounts ("$10", "$25", "$50", and "$100") as well as an input box for providing a custom or non-predetermined value amount. The white label merchant stored value peer funding page 406 also includes a funding scheduling section 406b that allows the peer user to make any funding amount available immediately, or on a date that may be identified by the peer user. The white label merchant stored value peer funding page 406 also includes a messaging section 406c in which the peer user may provide a message for the primary user along with, for example, any funding amount sent to the white label merchant stored value account.

FIG. 4C illustrates an example of the peer user device 400 displaying a white label merchant stored value peer funding page 408 that may be provided by, in this example, scrolling down from the white label merchant stored value peer funding page 406 of FIG. 4B. The white label merchant stored value peer funding page 408 include an occasion identifying section 408a that allows the peer user to identify an occasion (e.g., a "birthday", an "anniversary", etc.) for which the funding amount is being provided to the white label merchant stored value account of the primary user. The white label merchant stored value peer funding page 408 also includes a peer user account section 410 that includes account selectors 410a and 410b that the peer user may select to provide instructions to use the selected peer user account to fund the white label merchant stored value account with the amount designated in the value selector section 406a, and an add account button 410c that the peer user may select to provide peer user funding account information that may be utilized to fund the white label merchant stored value account. The white label merchant stored value peer funding page 408 also includes a send money button 412 that the peer user may select to send the funds defined via the white label merchant stored value peer funding pages 406 and 408 to the white label merchant stored value account of the primary user.

Referring now to FIG. 6C, an embodiment of the payment service provider device 600 coupled to peer user devices 634, 636, and 638 through the network 608 is illustrated. In particular, FIG. 6C illustrates how a payment service provider database 600a links the white label merchant stored value accounts provided to the merchants (discussed above with reference to FIG. 6A) with the primary user identifiers to associate primary users with each of those white label merchant stored value accounts, and links peer user identifiers with those white label merchant stored value accounts/primary user identifiers to associate peer users with the white label merchant stored value accounts/primary users. For example, a peer user identifier 640 is linked in the payment service provider database 600a with a primary user identifier 622 that is linked with a white label merchant stored value account 611a provided to a merchant (identified by the merchant identifier 610) by the payment service provider device 600, a peer user identifier 642 is linked in the payment service provider database 600a with the primary user identifier 622 that is linked with a white label merchant stored value account 611b provided to a merchant (identified by the merchant identifier 610) by the payment service provider device 600, and a peer user identifier 644 is linked in the payment service provider database 600a with the primary user identifier 622 that is linked with a white label merchant stored value account 611c provided to a merchant (identified by the merchant identifier 610) by the payment service provider device 600.

Similarly, a peer user identifier 646 is linked in the payment service provider database 600a with a primary user identifier 624 that is linked with a white label merchant stored value account 611b provided to a merchant (identified by the merchant identifier 610) by the payment service provider device 600, a peer user identifier 648 is linked in the payment service provider database 600a with the primary user identifier 624 that is linked with a white label merchant stored value account 611b provided to a merchant (identified by the merchant identifier 610) by the payment service provider device 600, and a peer user identifier 650 is linked in the payment service provider database 600a with the primary user identifier 624 that is linked with a white label merchant stored value account 611c provided to a merchant (identified by the merchant identifier 610) by the payment service provider device 600.

Similarly, a peer user identifier 652 is linked in the payment service provider database 600a with a primary user identifier 626 that is linked with a white label merchant stored value account 611c provided to a merchant (identified by the merchant identifier 610) by the payment service provider device 600, a peer user identifier 654 is linked in the payment service provider database 600a with the primary user identifier 626 that is linked with a white label merchant stored value account 611c provided to a merchant (identified by the merchant identifier 610) by the payment service provider device 600, and a peer user identifier 656 is linked in the payment service provider database 600a with the primary user identifier 626 that is linked with a white label merchant stored value account 611c provided to a merchant (identified by the merchant identifier 610) by the payment service provider device 600.

One of skill in the art in possession of the present disclosure will recognize that any number of merchant may have their associated white label merchant stored value accounts associated with primary user identifiers and peer user identifiers in a similar manner. As discussed in further detail below, FIG. 6C illustrates a third level of database linking (i.e., between peer users and primary users/white label merchant stored value accounts provided to different merchants) that provides for the peer linking and funding of white label merchant stored value accounts provided by the payment service provider device to a plurality of different merchants.

Figure 6E:
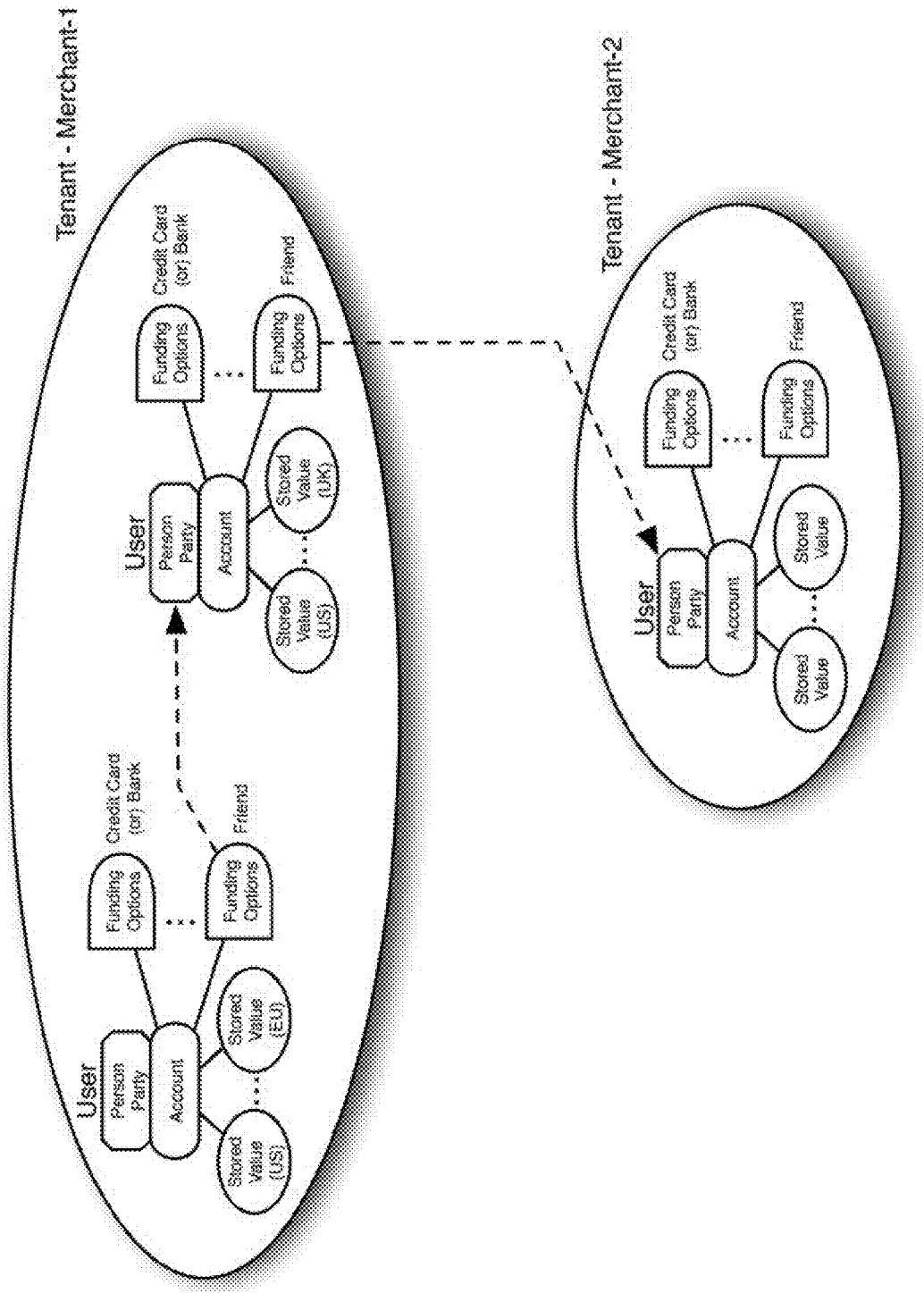
FIG. 6E is a schematic view illustrating an embodiment of the linking of peer user funding options across merchants/tenants.
Figure 6F:
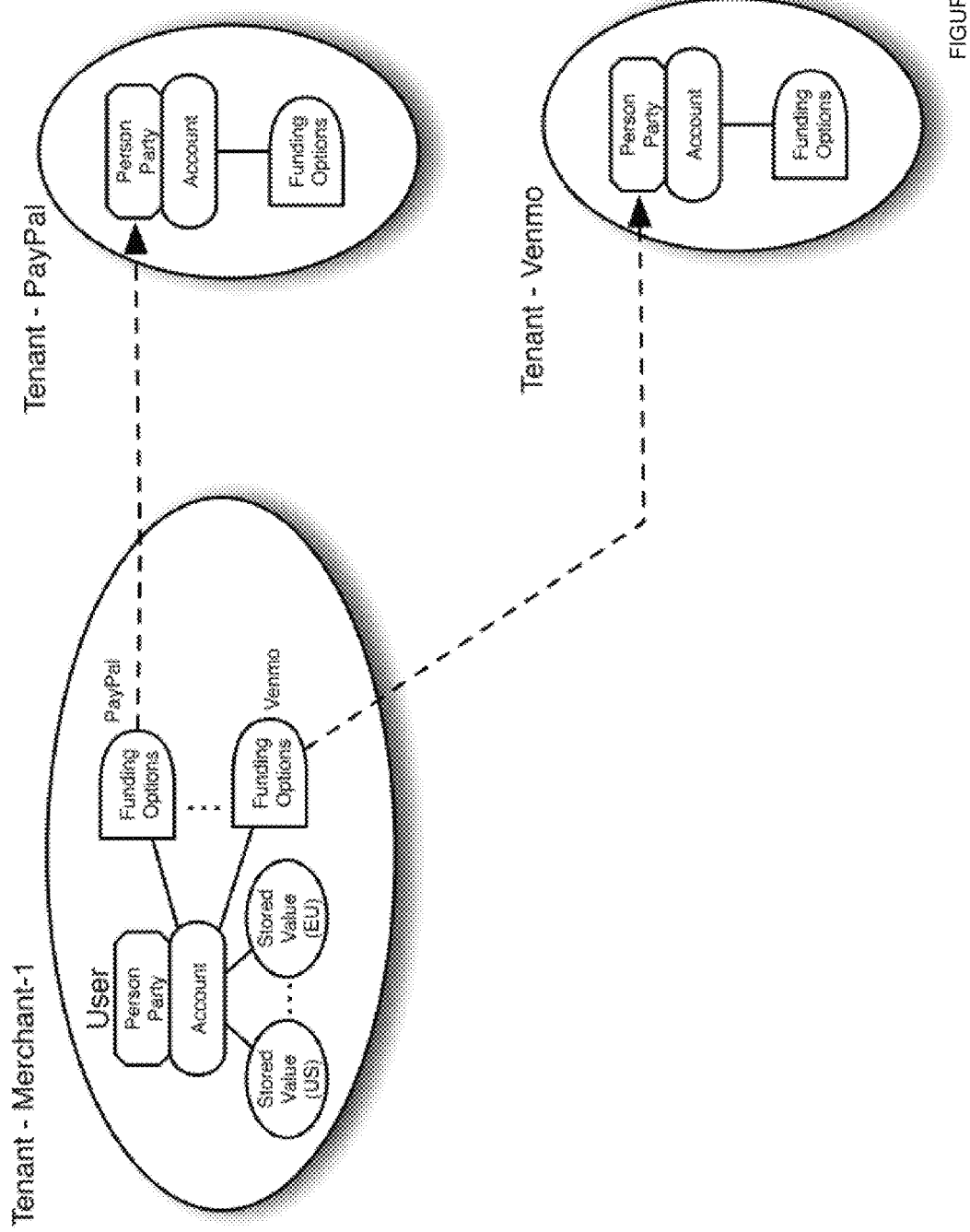
FIG. 6F is a schematic view illustrating an embodiment of the linking of wallet providers with users provided stored value accounts with particular merchants.

Referring now to FIGS. 6E and 6F, the modeling of country-specific white label merchant stored value accounts and merchant/tenants is illustrated. As can be seen, "Tenant—Merchant F" may be associated with a plurality of users, each of which has an associated account that may include a variety of different stored values that may be country specific, as well as a variety of different funding options (e.g., credit card, bank, "PayPal", and "Venmo"), along with other users as their funding options. In addition, "Tenant—Merchant 2" may be associated with a plurality of users, any of which may be a funding option for a user of "Tenant—Merchant 1". As such, the system allows users of the same merchant to be linked, and users of different merchants to be linked as well, providing for hierarchical linking between users. In addition, payment account providers (e.g., "PayPal" and "Venmo" may be modeled as tenants similarly to the merchants, with funding options associated with users of merchant linked to payment accounts provided by those payment account providers, along with the funding options associated with those payment accounts.

In some embodiments, the payment service provider device may operate to monitor the activity of peer users (e.g., via their peer user identifiers) linked with the white label merchant stored value accounts/primary users in order to track funding activity by those peer user and that white label merchant stored value account and, if that funding activity does not reach some minimum level of funding activity (e.g., a predetermined funding amount per year), unlink the peer user from the white label merchant stored value account/primary user. For example, the payment service provider device may monitor, subsequent to associating the peer user identifiers 640-644 with the white label merchant stored value account 611a/primary user identifier 622, the funding activities associated with the peer user identifiers 640-644 and the white label merchant stored value account 611a. In the event the funding activity associated with any of the peer user identifiers 640-644 white label merchant stored value account 611a drops below a minimum level, that peer user identifier may be unlinked from the white label merchant stored value account 611a/primary user identifier 622.

Referring back to FIG. 1, the method 100 then proceeds to block 110 where the payment service provider device funds white label merchant stored value accounts using peer accounts. In an embodiment, at block 110 and in response to instructions from any of the peer users linked to a white label stored value account of a primary user as discussed above, the payment service provider device may operate to fund the white label merchant stored value accounts of primary users using accounts identified by peer users. As discussed above with reference to the example provided in FIG. 4B, the funding of a white label merchant stored value account using a funding account identified by a peer user may be subject to funding timing information that instructs the funding of the white label merchant stored value account immediately, or at a later date. While not explicitly illustrated in FIG. 4B, such funding timing information may include reoccurring funding information that instructs the funding of the white label merchant stored value account on a reoccurring basis (e.g., weekly, monthly, yearly, etc.) As such, at block 110, the payment service provider device may determine a current time, and then determine whether funding timing information or reoccurring funding information provided by the peer user indicates that the white label merchant stored value account should be funded with the account identified by the peer user at block 110 (e.g., during a current time period). Thus, at block 110, the payment service provider device operates to utilize the peer account information provided by the peer user to access a peer user account and transfer funds from that peer user account to the white label merchant stored value account of the primary user.

Figure 3H:
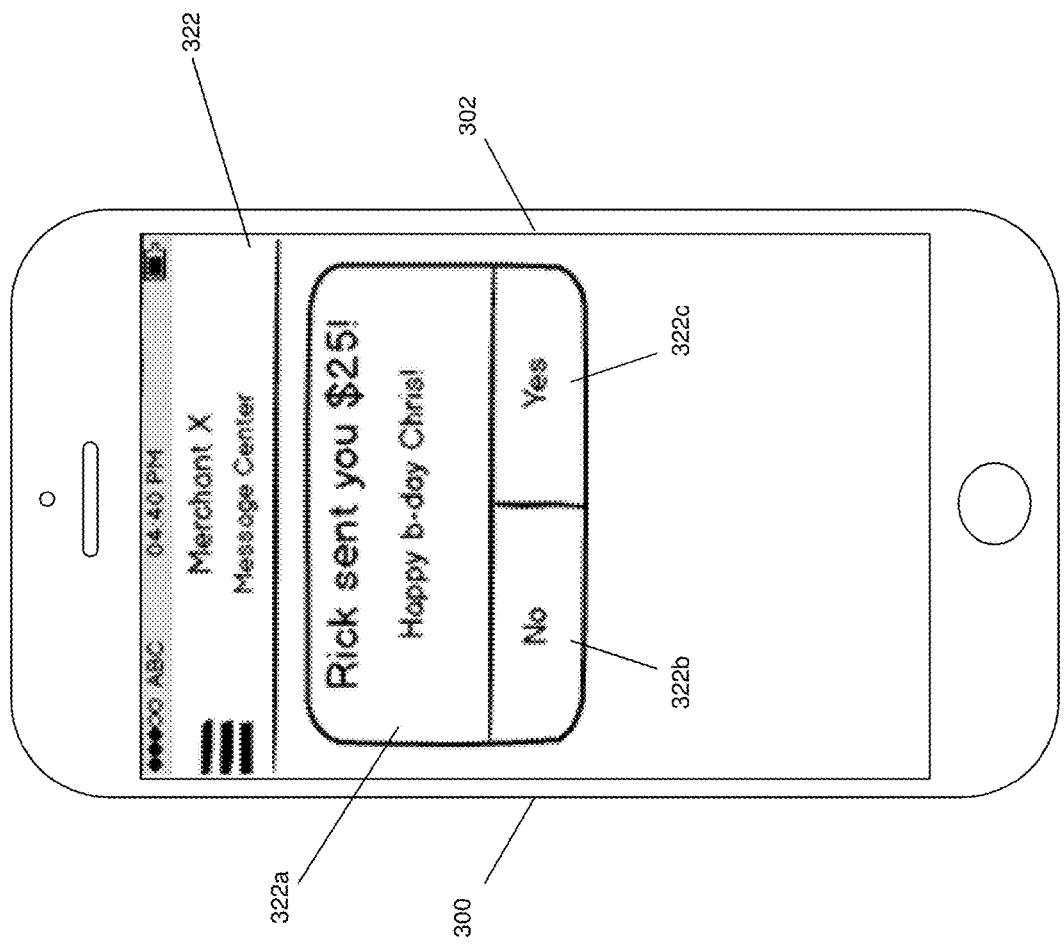
FIG. 3H is a screen shot illustrating an embodiment of a user device displaying a white label merchant stored value account funding alert page.
Figure 3I:
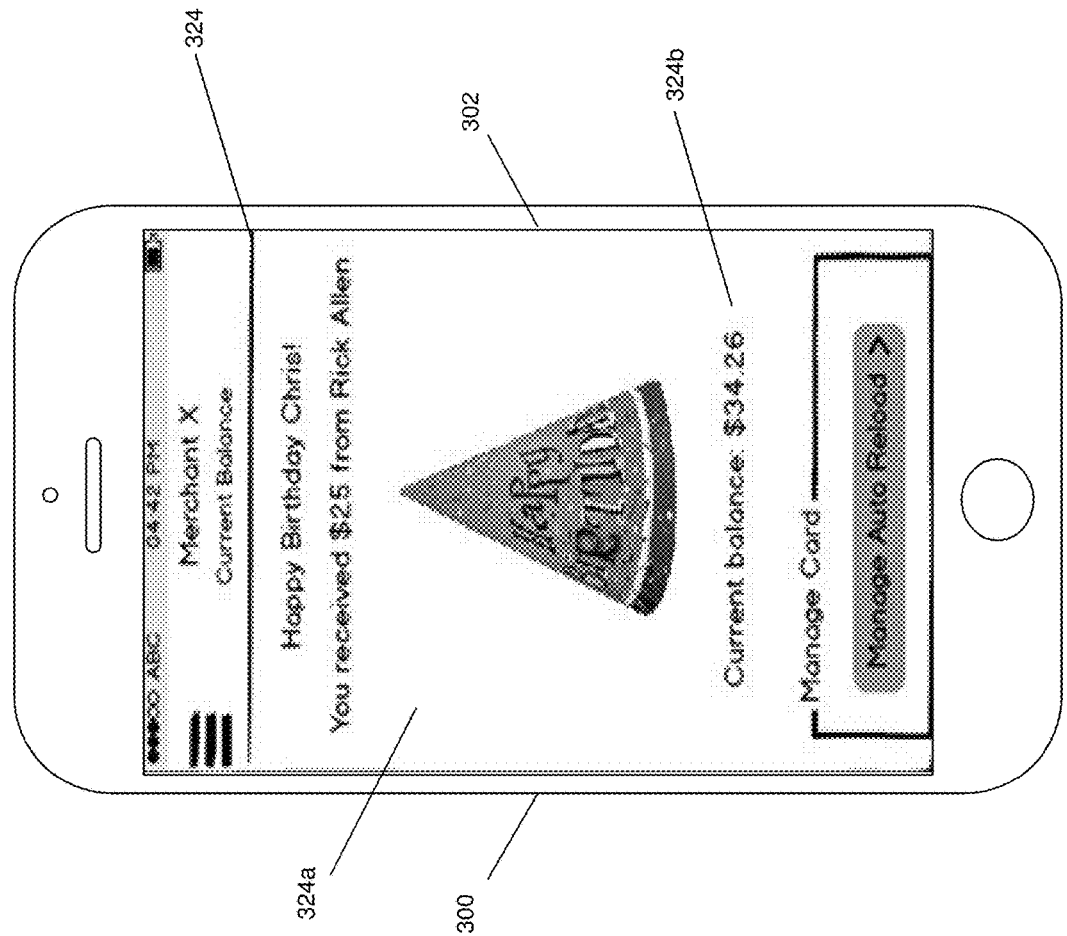
FIG. 3I is a screen shot illustrating an embodiment of a user device displaying a white label merchant stored value account funding alert page.

With reference to FIGS. 3H and 3I, the primary user device 300 is illustrated displaying screenshots of white label merchant account funding alert pages that may be provided through the network by the payment service provider device at block 110. For example, FIG. 3H illustrates an example of the peer user device 400 displaying a white label merchant stored value account funding alert page 322 that may be provided for display on the primary user device 300 accessing the merchant application provided by the merchant. As such, the primary user of the primary user device 300 may launch a merchant application on the primary user device 300 and, in response, the payment service provider device and/or the merchant application may determine that the white label merchant stored value account funding alert page 322 should be displayed to the primary user (e.g., because the peer user has funded the white label merchant stored value account of the primary user). In the illustrated example, the white label merchant stored value account funding alert page 322 is provided by a pop-up message (e.g., displayed via the merchant application) that includes a peer funding alert 322a that informs the primary user that the peer user has funded their white label merchant stored value account, along with a decline button 322b and an accept button 322c. As such, the primary user may select the decline button 322b to decline the funding of their white label merchant stored value account by the peer user, or select the accept button 322c to accept the funding of the white label merchant stored value account by the peer user.

FIG. 3I illustrates an example of the primary user device 300 displaying a white label merchant stored value account funding alert page 324 in response to the peer user selecting the accept button 322c on the white label merchant stored value account funding alert page 322. The white label merchant stored value account funding alert page 324 includes a peer message section 324a that identifies the funding amount provided by the peer user, and includes a message that was provided by the peer user along with the instructions to fund the white label merchant stored value account. The white label merchant stored value account funding alert page 324 also includes an account balance indicator 324b that informs the primary user of the current balance of the white label merchant stored value account (which includes the amount funded by the peer user in this example).

Figure 5A:
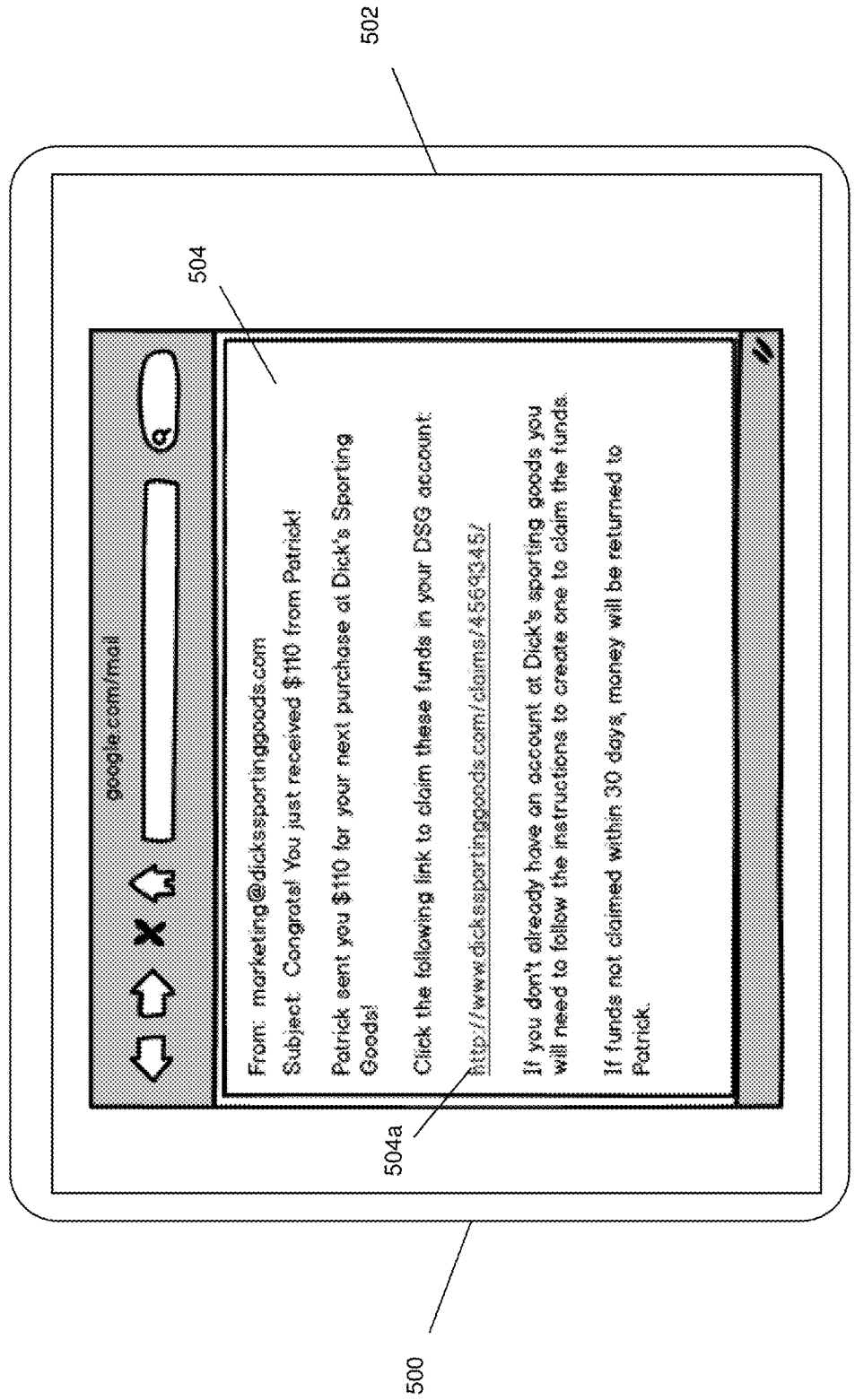
FIG. 5A is a screen shot illustrating an embodiment of a user device displaying a white label merchant stored value peer funded alert page.

With reference to FIGS. 5A-5D, another embodiment of a primary user device 500 including a display screen 502 is illustrated, and provides another example of the displaying of screenshots of white label merchant account funding alert pages that may be provided through the network by the payment service provider device at block 108. For example, FIG. 5A illustrates an example of the primary user device 500 displaying a white label merchant stored value peer funded alert page 504 that may be provided by the payment service provider to the primary user via an email application running on the primary user device 500, that identifies to the primary user that a white label merchant stored value account has been funded for them by a peer user, and that includes a link 504a to a webpage where the primary user may claim the funds in that white label merchant stored value account, either by accessing a previously created white label merchant stored value account, or registering for the white label merchant stored value account funded by the peer user.

Figure 5B:
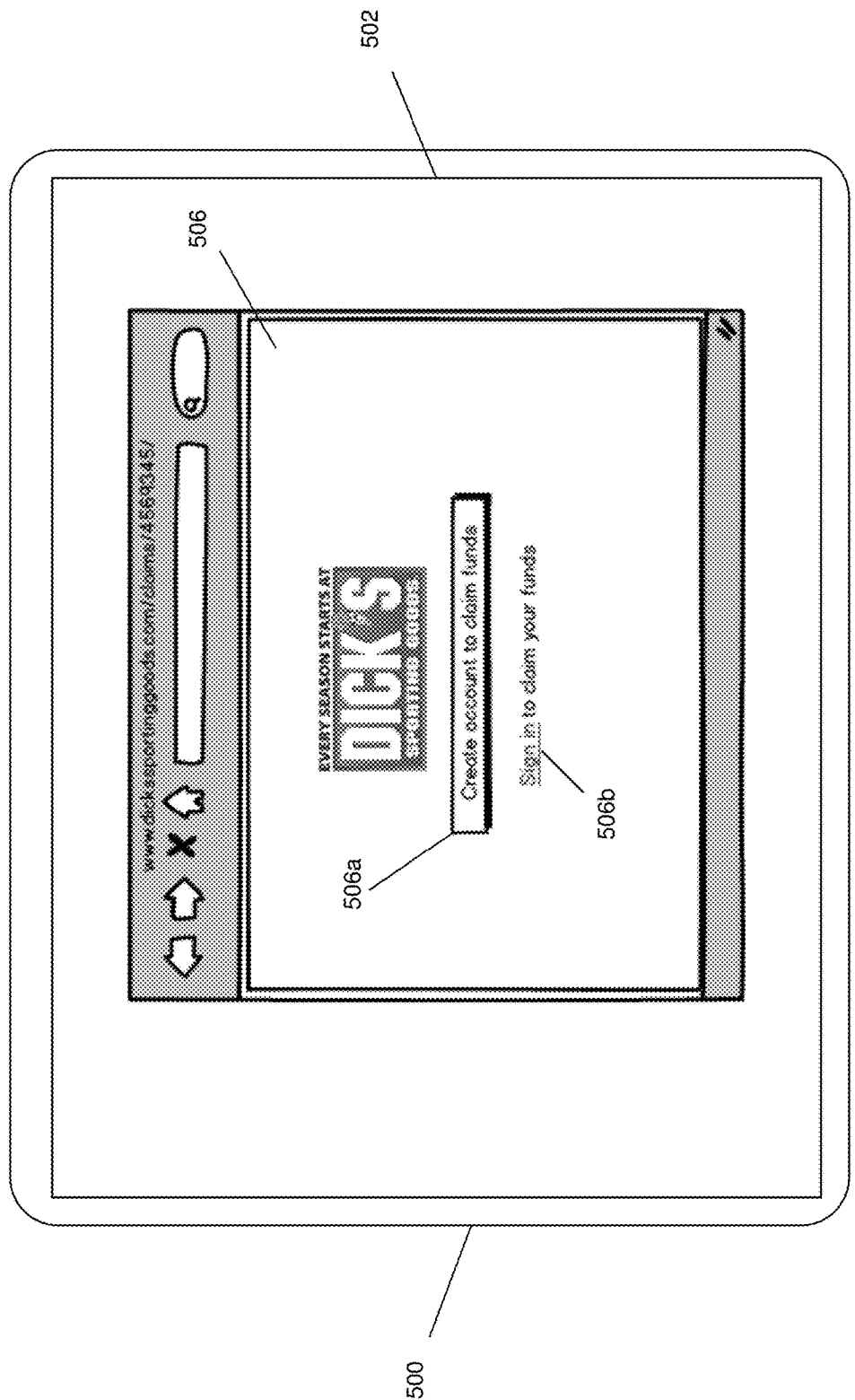
FIG. 5B is a screen shot illustrating an embodiment of a user device displaying a white label merchant stored value account access page.

FIG. 5B illustrates an example of the primary user device 500 displaying a white label merchant stored value account access page 506 that may be provided for display on the primary user device 500 by a payment service provider device in response to the primary user selecting the link 504a included on the white label merchant stored value peer funded alert page 504. The white label merchant stored value account access page 506 includes a create account link 506a that the primary user may select if they need to create an account with the merchant (i.e., to register for and/or claim a white label merchant stored value account funded by a peer user), and a sign in link 506b that the primary user may select if they have previously registered, with or are otherwise linked to, a white label merchant stored value account with the merchant that has been funded by the peer user and that they wish to access.

Figure 5C:
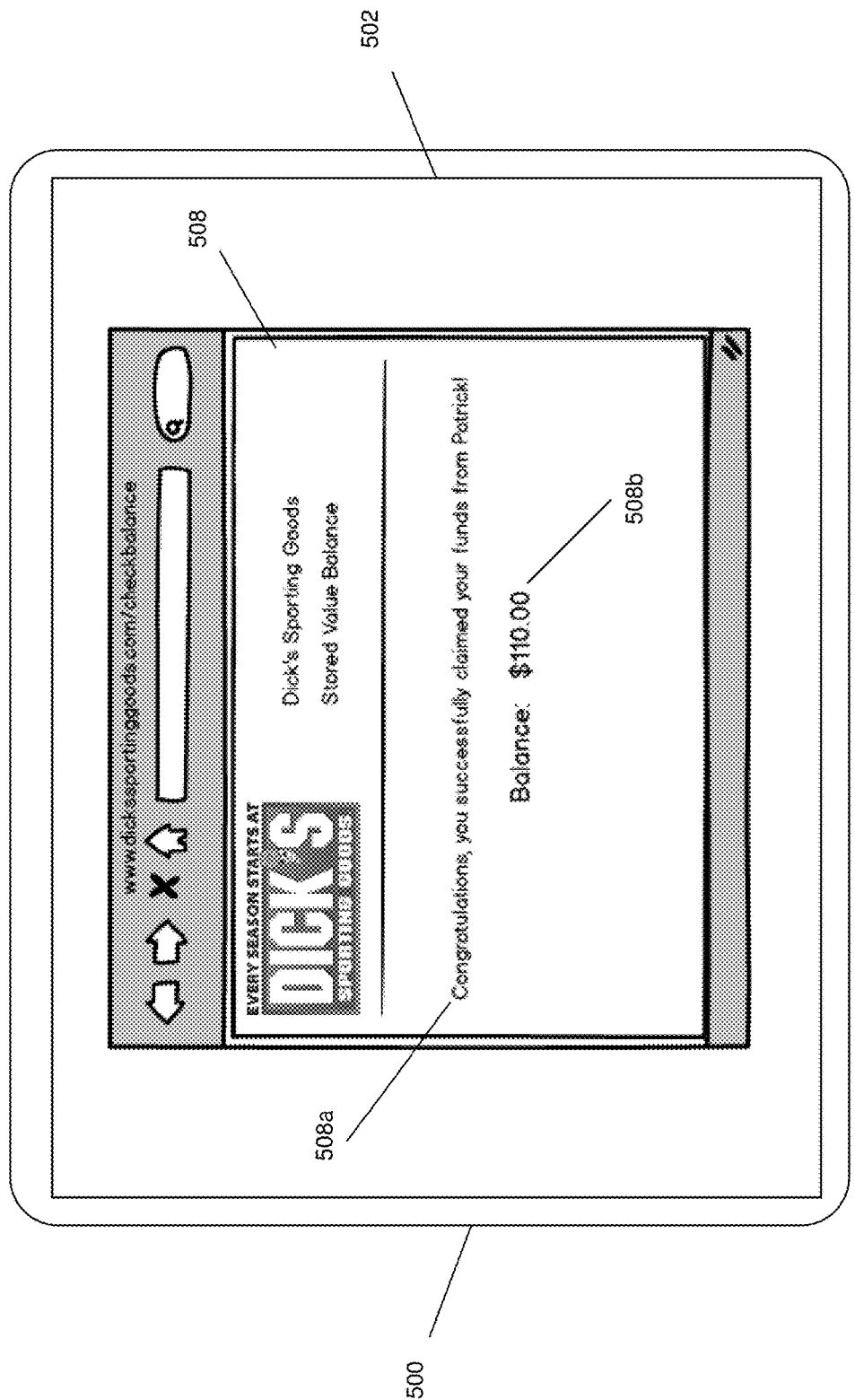
FIG. 5C is a screen shot illustrating an embodiment of a user device displaying a white label merchant stored value account balance page.

FIG. 5C illustrates an example of the primary user device 500 displaying a white label merchant stored value account balance page 508 that may be provided for display on the primary user device 500 by the payment service provider device in response to the primary user selecting the sign in link 506b on the white label merchant stored value account access page 506 and providing authentication credentials to access a white label merchant stored value account to which they are linked. The white label merchant stored value account balance page 508 includes a peer user funding alert 508a that identifies an amount funded by the peer user, and a balance identifier 508b that indicates a balance of the white label merchant stored value account of the primary user.

Figure 5D:
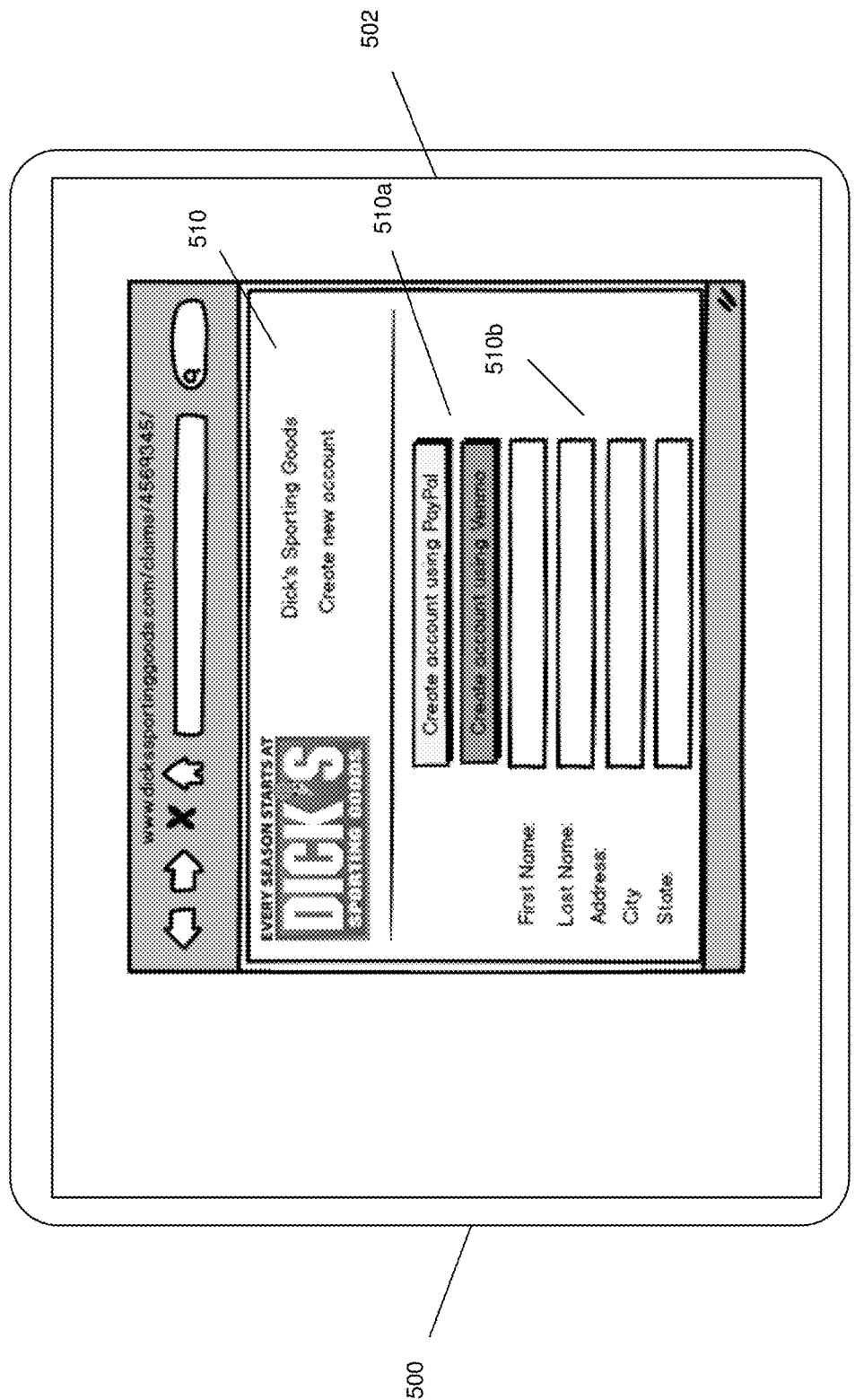
FIG. 5D is a screen shot illustrating an embodiment of a user device displaying a white label merchant stored value account creation page.

FIG. 5D illustrates an example of the primary user device 500 displaying a white label merchant stored value account creation page 510 that may be provided for display on the primary user device 500 by the payment service provider device in response to the primary user selecting the create account link 506a on the white label merchant stored value account access page 506. The white label merchant stored value account creation page 510 includes a funding account selection section 510a that the primary user may user to select a primary user funding account for association with the white label merchant stored value account, and a primary user information section 510b in which the primary user may provide a variety of information necessary for registering for the white label merchant stored value account with the merchant.

Figure 8:
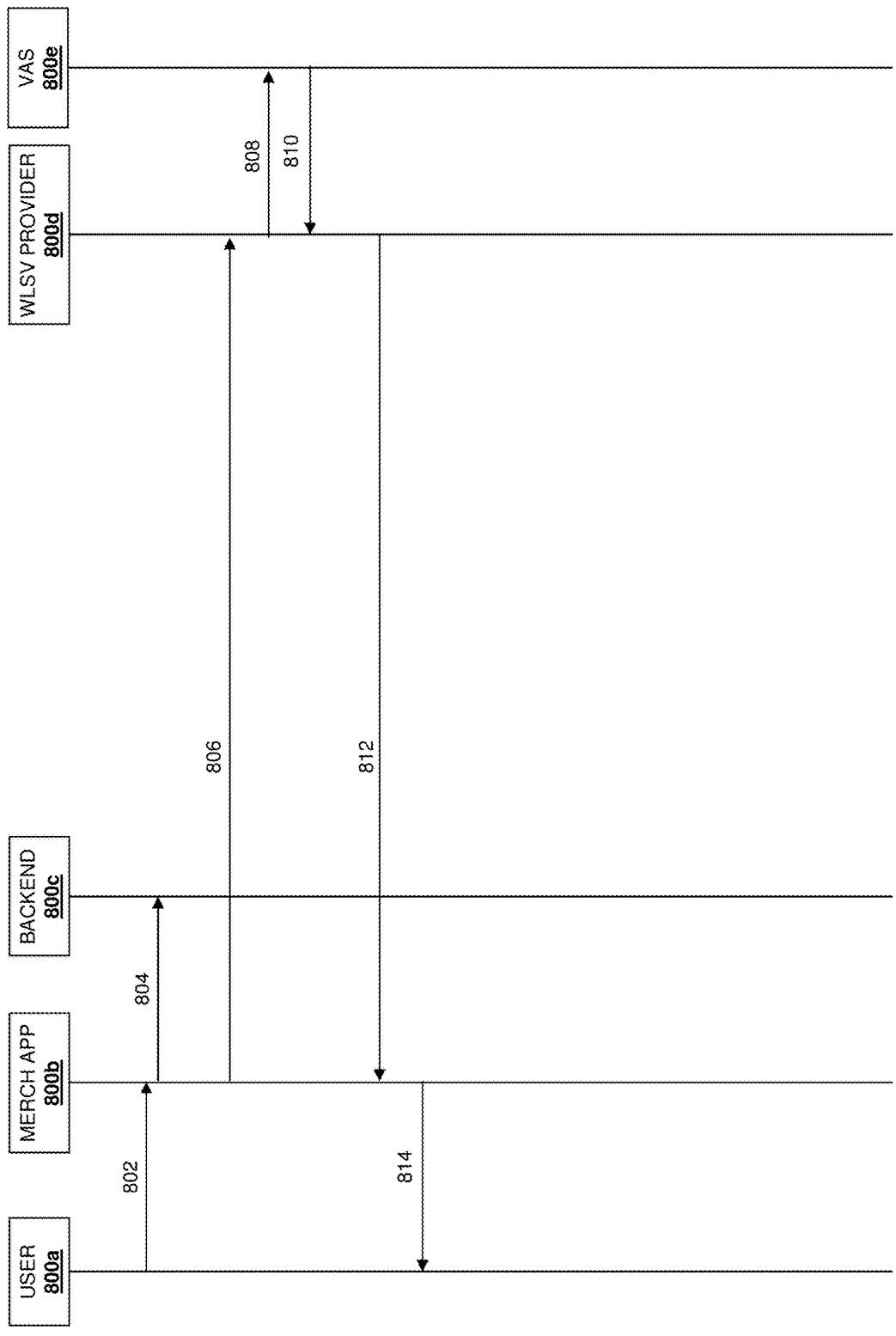
FIG. 8 is a swim lane diagram illustrating an embodiment of a method for peer funding of a white label merchant stored value account.
Figure 9:
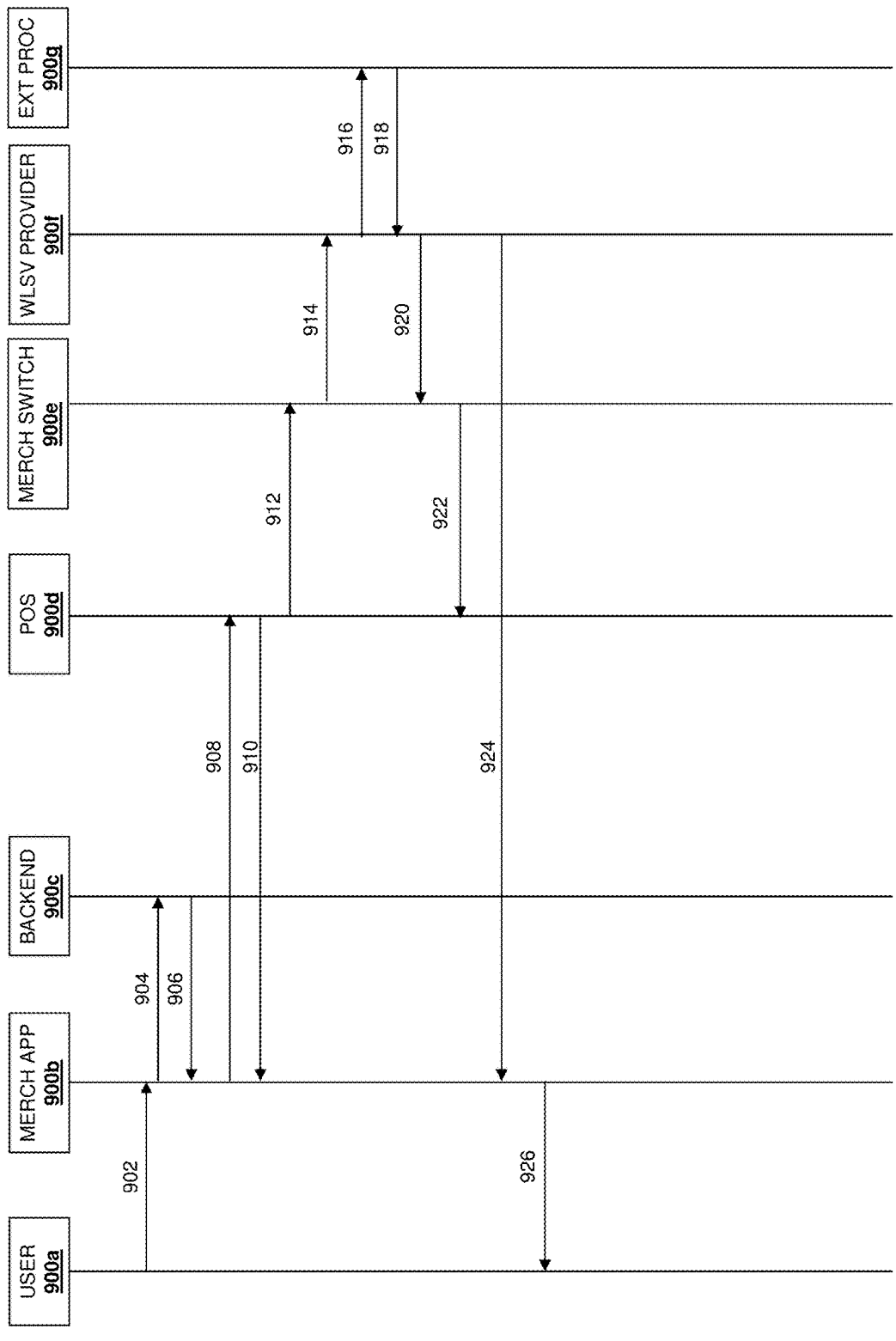
FIG. 9 is a swim lane diagram illustrating an embodiment of a method for using a white label merchant stored value account.

With reference to FIG. 8, a swim lane diagram 800 is provided that illustrates an embodiment of the funding of a white label merchant stored value account by peer users. In the illustrated embodiment, a user 800a, a merchant application 800b, an application backend 800c, a white label stored value provider 800d, and a white label stored value provider value added services component 800e. As can be seen, at 802, the user 800a can instruct the merchant application 800b to provide funds to another user's stored value card/account, and at 804 the merchant application 800b can send that funding instruction to the application backend 800c. At 806, the application backend 800c provides a send funds request to the WLSV provider 800d, and the WLSV provider 800d communicates with the value-added-services 800e to check for offers provided by merchants at 808, and then identifies those offers at 810 back to the WLSV provider 800d. As such, when funds are added, an offer can be added to the funds depending on whether the Merchant has funded a campaign for it. The platform is used in the context of funds management, and also operates to check if the merchant has a campaign to add offer via interacting with the White Label Platform Value Added Services. If an offer does exist, the associated funds are added to the amount, and the funds are send to the recipient. Funding success is then communicated by the WLSV provider 800d to the merchant application 800b at 812, and at 814 the merchant application operates to notify the user 800a of the funding. While FIG. 8 illustrates a use case involving a first user funding a second user's white label stored value account, one of skill in the art in possession of the present disclosure will recognize that a user may fund their own account in a substantially similar manner while remaining within the scope of the present disclosure as well.

The method 100 then proceeds to block 112 where the payment service provider device processes transactions from the primary user devices using the white label merchant stored value accounts. In an embodiment, at block 112, any primary user device with an associated white label merchant stored value account may utilize that white label merchant stored value account to perform transactions with the merchant. As such, the primary user may initiate any transaction with the merchant by selecting or presenting their white label merchant stored value account as a form of payment, and the payment service provider device will operate to identify that white label merchant stored value account, and transfer funds associated with the white label merchant stored value account to a merchant account of the merchant.

With reference to FIG. 7, a swim lane diagram 700 is provided that illustrates the use of a white label merchant stored value account by primary user with a merchant, and includes a user 900a, an merchant application 900b, an application backend 900c, a Point of Sale (POS) 900d, a merchant switch 900e, a white label stored value provider 900f, and an external processor 900g. As can be seen, at 902, the user 900a may select an option to pay for a transaction with their stored value card/account via the merchant application 900b. In response, at 904 the merchant application retrieves a stored Store Value payment token from the application backend 900c, which may be used by the merchant application 900b to generate a QR Code at 906 that is displayed by the merchant application 900b to the cashier at POS 900d at 908. At 910, the cashier at the POS 900d scans the QR Code, and at 912 the POS attempts to authorize the transaction by sending the store value token and an amount to the merchant switch 900e. At 914, the merchant switch 900e routes the authorization request to the WLSV provider 900f, which operates to retrieve all the relevant transaction information from the platform including, for example, a merchant identifier, consumer identifier, funding instrument related information, type of payment transaction and other related details. At 916 the WLSV provider 900f sends the transaction to the external processors 900g for processing. Assuming all the related transaction data is fine, the external processors 900g return a response of success at 918 to the WLSV provider 900f, which forwards that success response to the merchant switch 900e at 920, which then forwards the success response to the POS 900d at 922. The WLSV provider 900f also sends a success response to the merchant application 900b at 924, and the merchant application informs the user of that success at 926.

Thus, systems and methods have been described that address the technical problems associated with a payment service provider or other third party providing white label merchant stored value accounts to a plurality of different merchants, and then allowing primary users of those white label merchant stored value accounts to link peer users with their white label merchant stored value account in order to allow those peer users to fund their white label merchant stored value account. As such, a payment service provider may operate to offload the creation, tracking, and management of merchant stored value accounts from merchants, while providing for enhanced functionality associated with the funding of those merchant stored value accounts by providing a multi-level database linking scheme that allows groups of white label merchant stored value accounts to be provided to any of a plurality of different merchants, and provides for the association of primary users with the white label merchant stored value account, while also allowing for any number of peer users to be linked to a white label merchant stored value account so that those peer users may fund that white label merchant stored value account. One of skill in the art will recognize how the present application describes advances in white label stored value account technology by enabling the ability to add white label stored value accounts as part of any merchant's wallet application, including different merchants operating in a variety of different countries, and the ability to fund those white label stored value accounts from a variety of sources including other users that may be linked to those white label stored value accounts.

Figure 10:
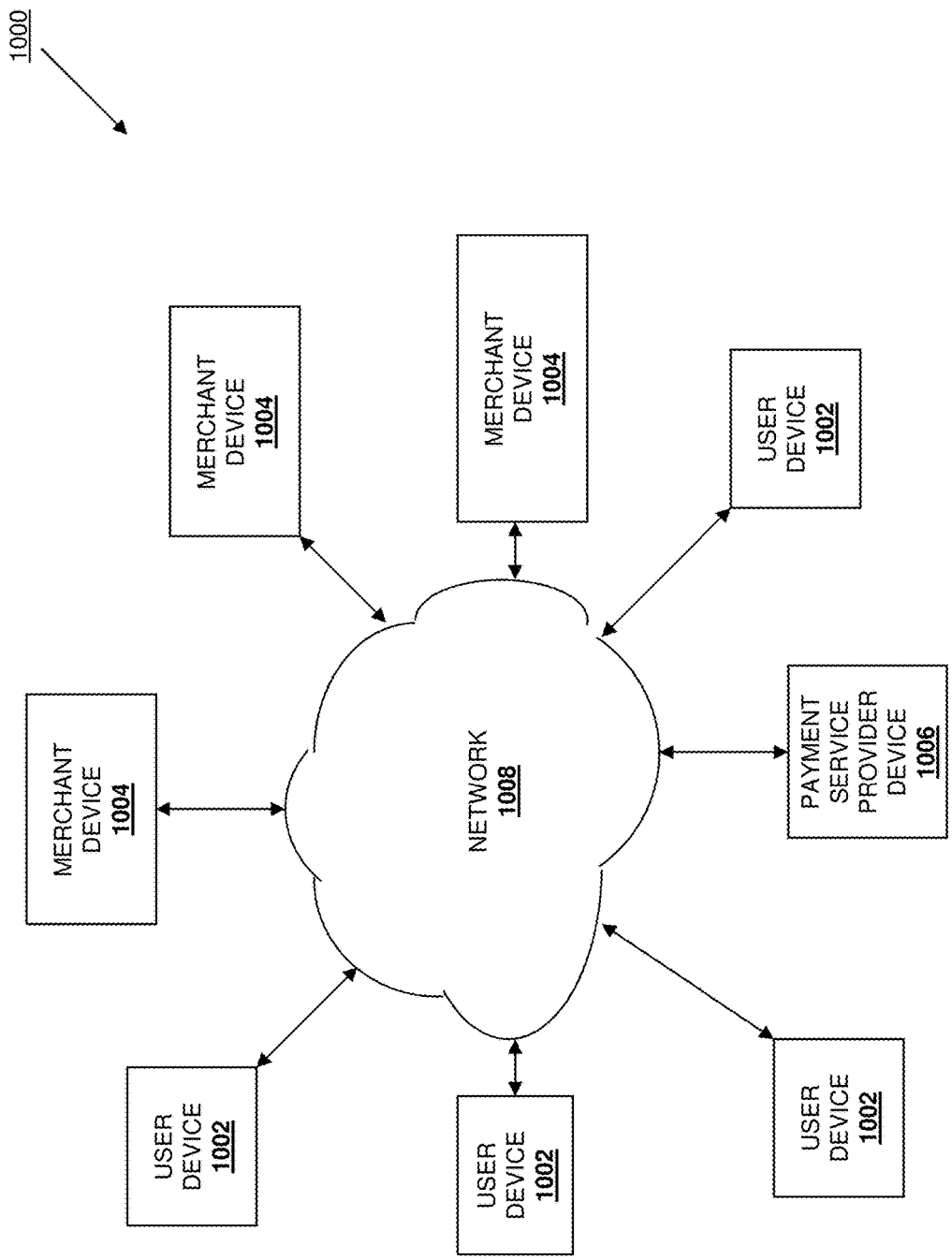
FIG. 10 is a schematic view illustrating an embodiment of a networked system.
Figure 11:
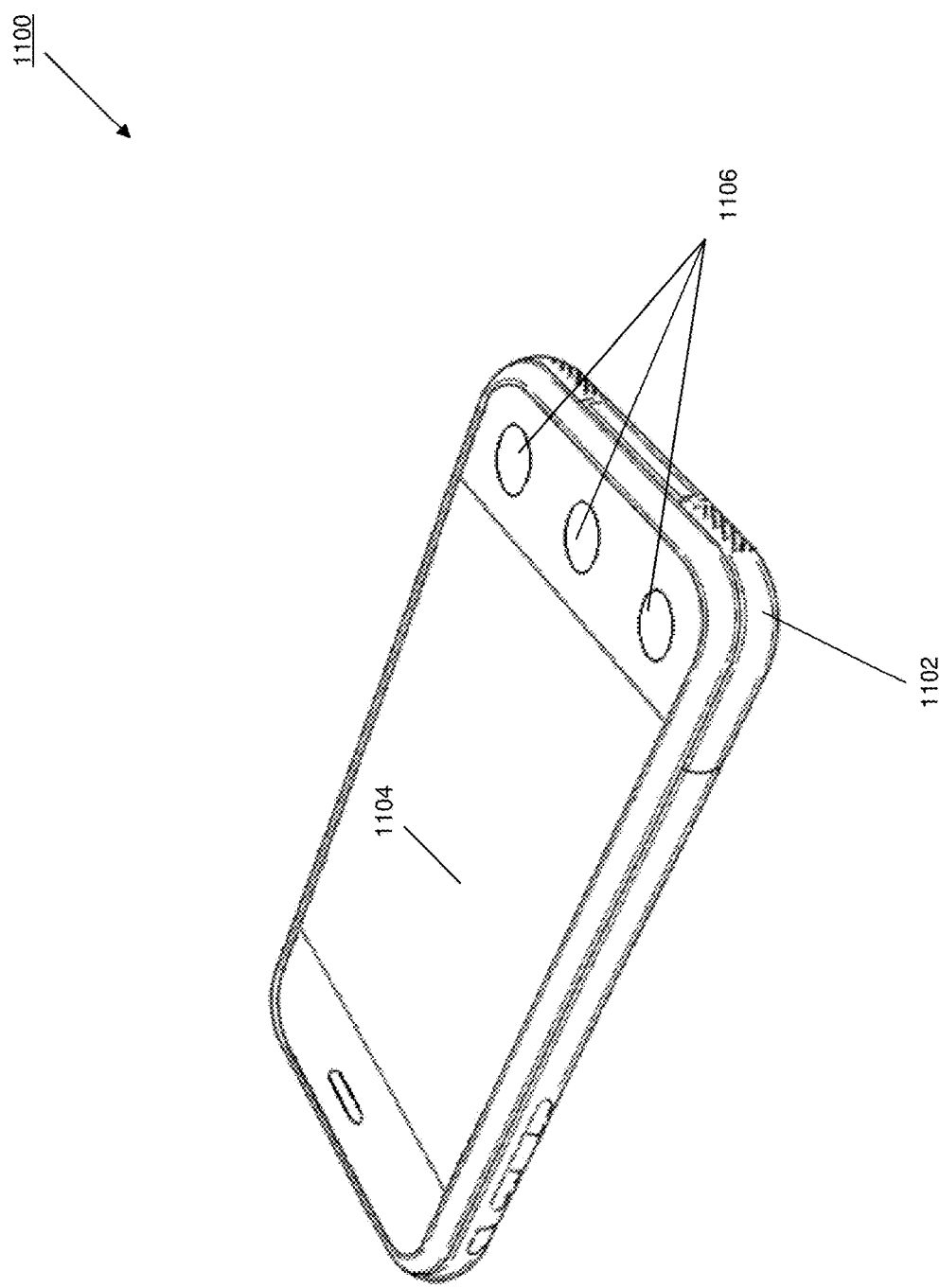
FIG. 11 is a perspective view illustrating an embodiment of a user device.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 6 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes a plurality of user devices 1002, and a payment service provider device 1006 in communication over a network 1008. Any of the user devices 1002 may be the primary user devices or the peer devices, discussed above. The merchant devices 1004 may be the merchant devices discussed above and may be operated by the merchants discussed above. The payment service provider device 1006 may be the payment service provider devices discussed above and may be operated by a payment service provider such as, for example, PayPal Inc. of San Jose, Calif.

The user devices 1002, merchant devices 1004, and payment service provider device 1006, may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 600, and/or accessible over the network 1008.

The network 1008 may be implemented as a single network or a combination of multiple networks. For example, in various embodiments, the network 1008 may include the Internet and/or one or more intranets, landline networks, wireless networks, and/or other appropriate types of networks.

The user device 1002 may be implemented using any appropriate combination of hardware and/or software configured for wired and/or wireless communication over network 1008. For example, in one embodiment, the user device 1002 may be implemented as a personal computer of a user in communication with the Internet. In other embodiments, the user device 1002 may be a smart phone, personal digital assistant (PDA), laptop computer, and/or other types of computing devices.

The user device 1002 may include one or more browser applications which may be used, for example, to provide a convenient interface to permit the users to browse information available over the network 1008. For example, in one embodiment, the browser application may be implemented as a web browser configured to view information available over the Internet.

The user device 1002 may also include one or more toolbar applications which may be used, for example, to provide user-side processing for performing desired tasks in response to operations selected by the user. In one embodiment, the toolbar application may display a user interface in connection with the browser application.

The user device 1002 may further include other applications as may be desired in particular embodiments to provide desired features to the user device 1002. In particular, the other applications may include a payment application for payments assisted by a payment service provider through the payment service provider device 1006. The other applications may also include security applications for implementing user-side security features, programmatic user applications for interfacing with appropriate application programming interfaces (APIs) over the network 1008, or other types of applications. Email and/or text applications may also be included, which allow the payer to send and receive emails and/or text messages through the network 1008. The user device 1002 includes one or more user and/or device identifiers which may be implemented, for example, as operating system registry entries, cookies associated with the browser application, identifiers associated with hardware of the user device 1002, or other appropriate identifiers, such as a phone number. In one embodiment, the user identifier may be used by the payment service provider device 1006 to associate the user with a particular account as further described herein.

The merchant device 1004 may be maintained, for example, by a conventional or on-line merchant, conventional or digital goods seller, individual seller, and/or application developer offering various products and/or services in exchange for payment to be received conventionally or over the network 1008. In this regard, the merchant device 1004 may include a database identifying available products and/or services (e.g., collectively referred to as items) which may be made available for viewing and purchase by the user.

The merchant device 1004 also includes a checkout application which may be configured to facilitate the purchase by the payer of items. The checkout application may be configured to accept payment information from the user through the user device 1002 and/or from the payment service provider through the payment service provider device 1006 over the network 1008.

Referring now to FIG. 7, an embodiment of a user device 1100 is illustrated. The user device 1100 may be the primary user devices or peer user devices discussed above. The user device 1100 includes a chassis 1102 having a display 1104 and an input device including the display 1104 and a plurality of input buttons 1106. One of skill in the art will recognize that the user device 1100 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 12:
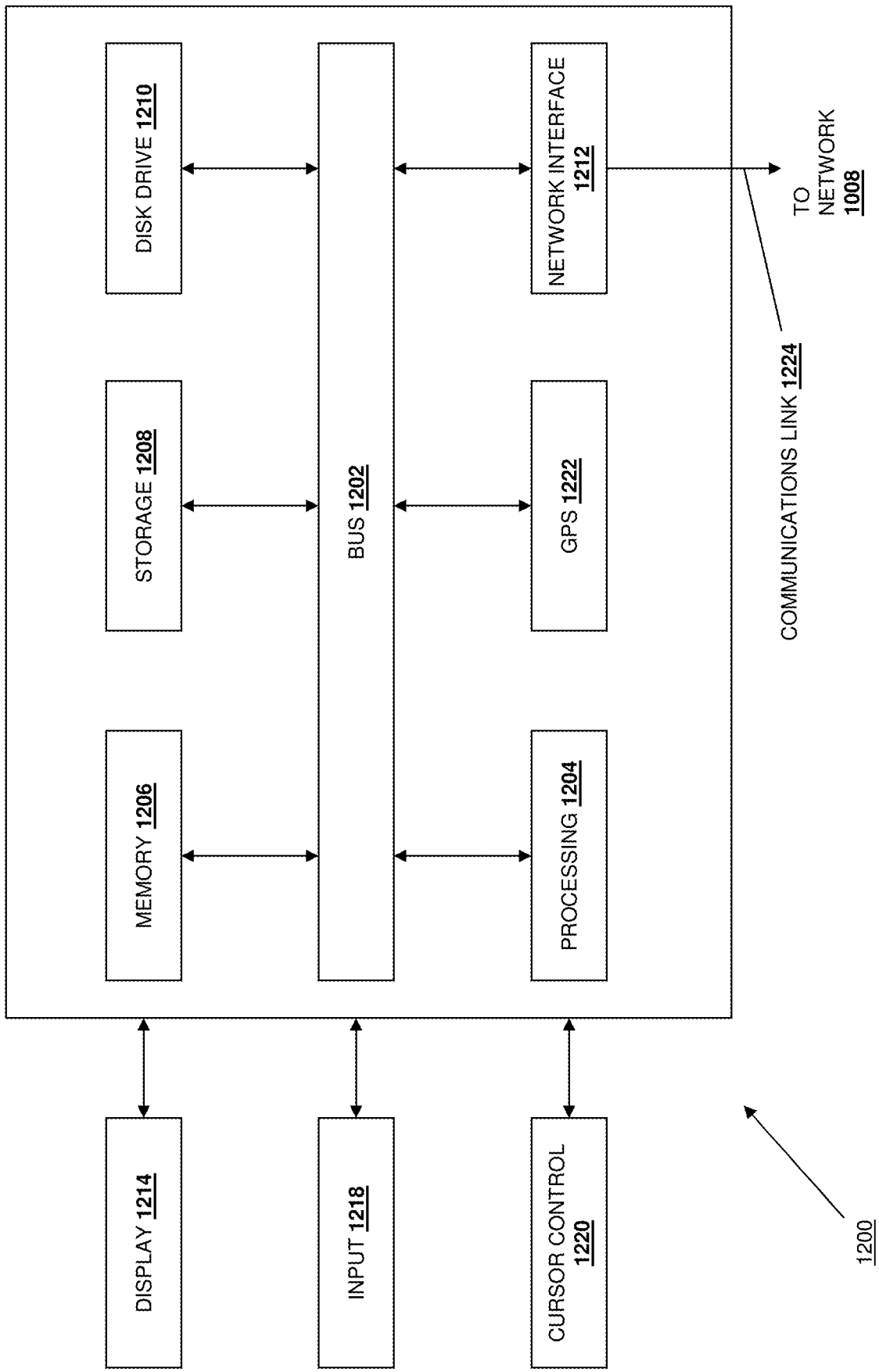
FIG. 12 is a schematic view illustrating an embodiment of a computer system.

Referring now to FIG. 12, an embodiment of a computer system 800 suitable for implementing, for example, the user devices, merchant devices, and/or payment service provider devices discussed above, is illustrated. It should be appreciated that other devices utilized by users, merchants, and/or payment service providers in the payment system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and/or a location determination component 1222 (e.g., a Global Positioning System (GPS) device as illustrated, a cell tower triangulation device, and/or a variety of other location determination devices known in the art.) In one implementation, the disk drive component 810 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the user devices, the merchant devices, and/or the payment service provider device. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 1008 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
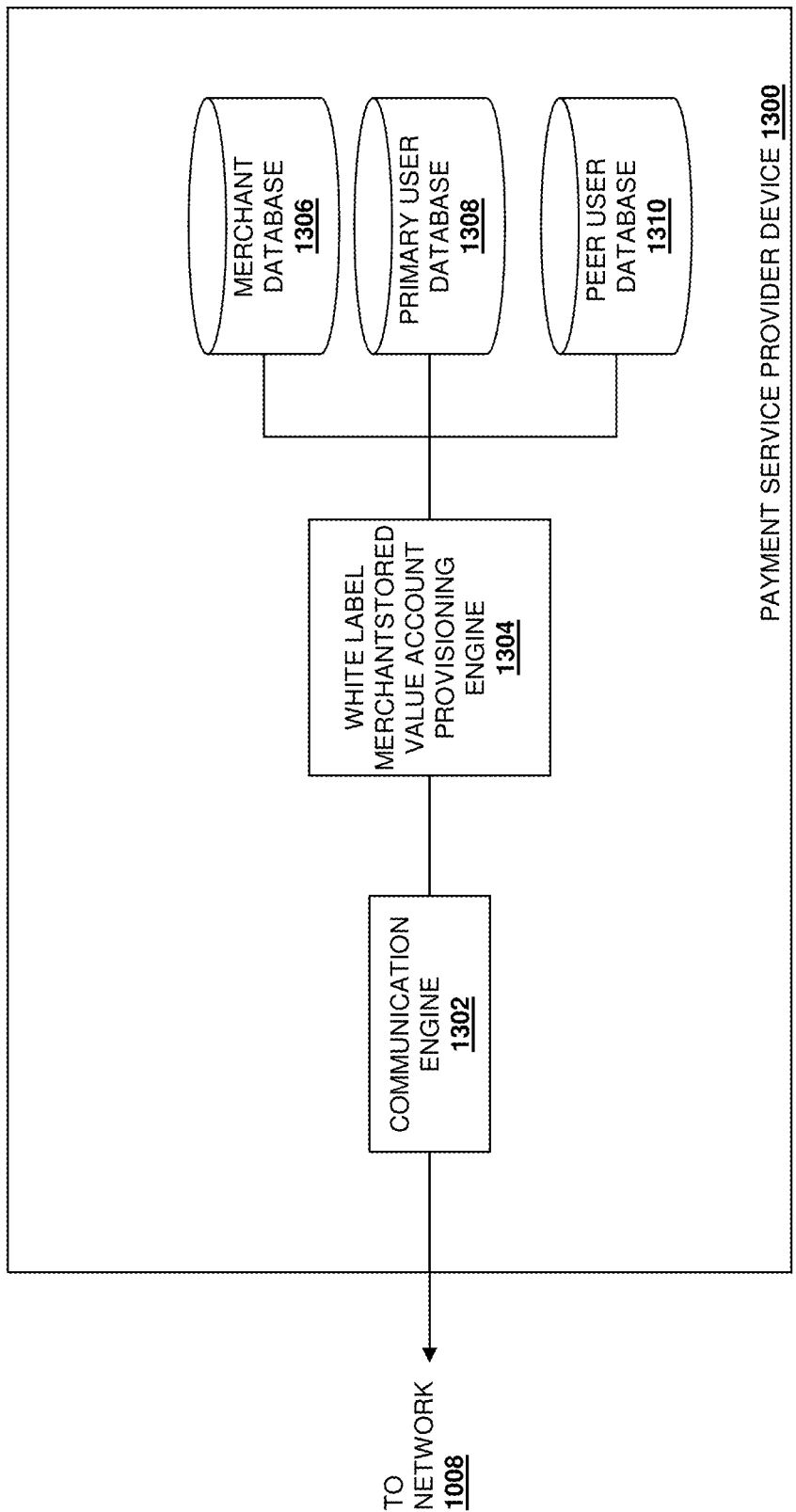
FIG. 13 is a schematic view illustrating an embodiment of a payment service provider device.

Referring now to FIG. 13, an embodiment of a payment service provider device 1300 is illustrated. The device 1300 includes a communication engine 1302 that is coupled to the network 1008 and to a white label merchant stored value account provisioning engine 1304 that is coupled to a database system that includes a merchant database 1306, a primary user database 1308, and a peer user database 1310. The communication engine 1302 may be software or instructions stored on a computer-readable medium that allows the device 1300 to send and receive information over the network 1008. The white label merchant stored value account provisioning engine 1304 may be software or instructions stored on a computer-readable medium that is that is configured to provide any of the other functionality that is discussed above. While the database system has been illustrated as located in the device 1300, one of skill in the art will recognize that it may be connected to the white label merchant stored value account provisioning engine 1304 through the network 1008 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A white label merchant stored value account peer linking and funding system, comprising:
   a database storing associations between each of a plurality of different merchants and a respective group of white label merchant stored value accounts;
   a non-transitory memory; and
   one or more hardware processors coupled to the non-transitory memory and configured to execute instructions from the non-transitory memory to cause the system to perform operations comprising:
   receiving, through a network from a first user device, a first user identifier;
   linking, in the database, the first user identifier with a first white label merchant stored value account that is included in a first group of white label merchant stored value accounts that are associated with a first merchant in the database;
   receiving, through the network from the first user device, a plurality of second user identifiers;
   contacting, through the network, a plurality of second user devices that are each associated with a respective one of the plurality of second user identifiers;
   linking, in the database in response to authorization received through the network from each of the plurality of second user devices, the plurality of second user identifiers with the first white label merchant stored value account;
   receiving, through the network from each of the plurality of second user devices, respective second user account information; and
   funding, based on the linking of the plurality of second user identifiers with the first white label merchant stored value account, the first white label merchant stored value account with respective first funding amounts using the respective second user account information received from each of the plurality of second user devices.

2. The system of claim 1, wherein the operations further comprise:
   receiving, through the network from a third user device, a third user identifier;
   linking, in the database, the third user identifier with a second white label merchant stored value account that is included in a second group of white label merchant stored value accounts that are associated with a second merchant in the database;
   receiving, through the network from the third user device, a plurality of fourth user identifiers;
   contacting, through the network, a plurality of fourth user devices that are each associated with a respective one of the plurality of fourth user identifiers;
   linking, in the database in response to authorization received through the network from each of the plurality of fourth user devices, the plurality of fourth user identifiers with the second white label merchant stored value account;
   receiving, through the network from each of the plurality of fourth user devices, respective fourth user account information; and
   funding, based on the linking of the plurality of fourth user identifiers with the second white label merchant stored value account, the second white label merchant stored value account using the respective fourth user account information received from each of the plurality of fourth user devices.

3. The system of claim 1, wherein the operations further comprise:
   receiving, through the network from the first user device, first user account information; and
   funding, based on the linking of the first user identifier with the first white label merchant stored value account, the first white label merchant stored value account using the first user account information received from the first user devices.

4. The system of claim 1, wherein the operations further comprise:
monitoring, based on the linking of the plurality of second user identifiers with the first white label merchant stored value account and subsequent to funding the first white label merchant stored value account with the respective first funding amounts, subsequent funding activity associated with each of the plurality of second user identifiers; and
unlinking, in the database based on the subsequent funding activity, at least some of the plurality of second user identifiers with the first white label merchant stored value account.

5. The system of claim 1, wherein the operations further comprise:
receiving, through the network from at least one of the plurality of second user devices, funding timing information along with the respective second user account information;
determining a current time period; and
funding, based on the linking of the plurality of second user identifiers with the first white label merchant stored value account and in response to the funding timing information indicating that funding should occur during the current time period, the first white label merchant stored value account with the respective first funding amount using the respective second user account information received from the at least one of the plurality of second user devices that provided the funding timing information.

6. The system of claim 1, wherein the operations further comprise:
receiving, through the network from at least one of the plurality of second user devices, reoccurring funding information along with the respective second user account information;
determining a current time period; and
funding, based on the linking of the plurality of second user identifiers with the first white label merchant stored value account and in response to the reoccurring funding information indicating that funding should occur during the current time period, the first white label merchant stored value account with a respective second funding amount using the respective second user account information received from the at least one of the plurality of second user devices that provided the reoccurring funding information.

7. A method for peer linking and funding of white label merchant stored value accounts, comprising:
identifying, by a payment service provider device based on communications through a network with a first user device, a first user identifier;
associating, by the payment service provider device in a database, the first user identifier with a first white label merchant stored value account that is included in a first group of white label merchant stored value accounts that are provided to a first merchant and identified in the database;
identifying, by the payment service provider device based on communications through the network with the first user device, a plurality of second user identifiers;
communicating, by the payment service provider device through the network using the second user identifiers, with a plurality of second user devices;
associating, by the payment service provider device in the database in response to instructions received through the network from each of the plurality of second user devices, the plurality of second user identifiers with the first white label merchant stored value account;
identifying, by the payment service provider device based on communications through the network with each of the plurality of second user devices, respective second user account information; and
transferring, by the payment service provider device based on the association of the plurality of second user identifiers with the first white label merchant stored value account, respective first funding amounts to the first white label merchant stored value account using the respective second user account information.

8. The method of claim 7, further comprising:
identifying, by the payment service provider device based on communications through the network with a third user device, a third user identifier;
associating, by the payment service provider device in the database, the third user identifier with a second white label merchant stored value account that is included in a second group of white label merchant stored value accounts that are provided to a second merchant and identified in the database;
identifying, by the payment service provider device based on communications through the network with the third user device, a plurality of fourth user identifiers;
communicating, by the payment service provider device through the network using the fourth user identifiers, with a plurality of fourth user devices;
associating, by the payment service provider device in the database in response to instructions received through the network from each of the plurality of fourth user devices, the plurality of fourth user identifiers with the second white label merchant stored value account;
identifying, by the payment service provider device based on the communications through the network with each of the plurality of fourth user devices, respective fourth user account information; and
transferring, by the payment service provider device based on the association of the plurality of fourth user identifiers with the second white label merchant stored value account, respective second funding amounts to the second white label merchant stored value account using the respective fourth user account information.

9. The method of claim 8, further comprising:
identifying, by the payment service provider device based on communications through the network with the first user device, first user account information; and
transferring, by the payment service provider device based on the association of the first user identifier with the first white label merchant stored value account, a second funding amount to the first white label merchant stored value account using the first user account information.

10. The method of claim 7, further comprising:
determining, by the payment service provider device based on the association of the plurality of second user identifiers with the first white label merchant stored value account and subsequent to transferring the first funding amounts to the first white label merchant stored value account ts, subsequent funding activity associated with each of the plurality of second user identifiers; and
disassociating, by the payment service provider device in the database based on the subsequent funding activity, at least some of the plurality of second user identifiers with the first white label merchant stored value account.

11. The method of claim 7, further comprising
identifying, by the payment service provider device based on communications through the network from at least one of the plurality of second user devices, funding timing information along with the respective second user account information; and
transferring, by the payment service provider device based on the associating of the plurality of second user identifiers with the first white label merchant stored value account and in response to the funding timing information indicating that funding should occur during a current time period, the respective first funding amount to the first white label merchant stored value account using the respective second user account information identified in communications with the at least one of the plurality of second user devices that provided the funding timing information.

12. The method of claim 7, further comprising:
identifying, by the payment service provider device based on communications through the network with at least one of the plurality of second user devices, reoccurring funding information along with the respective second user account information; and
transferring, by the payment service provider device based on the association of the plurality of second user identifiers with the first white label merchant stored value account and in response to the reoccurring funding information indicating that funding should occur during a current time period, a respective second funding amount to the first white label merchant stored value account using the respective second user account information identified in the communications with the at least one of the plurality of second user devices that provided the reoccurring funding information.

13. The method of claim 7, further comprising:
generating and transmitting, by the payment service provider device through the network to the first user device in response to associating the first user identifier with the first white label merchant stored value account, a payment token;
determining, by the payment service provider device, that the payment token has been received through the network subsequent to the funding of the first white label merchant stored value account with the respective funding amounts; and
transferring, by the payment service provider device in response to receiving the payment token, at least some of the respective funding amounts to complete a transaction.

14. A non-transitory machine-readable medium having stored thereon machine-readable instructions executable to cause a machine to perform operations comprising:
linking, in a database, a first user identifier with a first white label merchant stored value account that is included in a first group of white label merchant stored value accounts that are managed for a first merchant;
receiving, through the network, a plurality of second user identifiers;
communicating, through the network, with a plurality of second user devices that are each associated with a respective one of the plurality of second user identifiers;
linking, in the database in response to an acceptance received through the network from each of the plurality of second user devices, the plurality of second user identifiers with the first white label merchant stored value account;
receiving, through the network from each of the plurality of second user devices, respective second user account information; and
funding, based on the linking of the plurality of second user identifiers with the first white label merchant stored value account, the first white label merchant stored value account with respective first funding amounts using the respective second user account information received from each of the plurality of second user devices.

15. The non-transitory machine-readable medium of claim 14, wherein the operations further comprise:
linking, in the database, a third user identifier with a second white label merchant stored value account that is included in a second group of white label merchant stored value accounts that are managed for a second merchant;
receiving, through the network, a plurality of fourth user identifiers;
communicating, through the network, with a plurality of fourth user devices that are each associated with a respective one of the plurality of fourth user identifiers;
linking, in the database in response to an acceptance received through the network from each of the plurality of fourth user devices, the plurality of fourth user identifiers with the second white label merchant stored value account;
receiving, through the network from each of the plurality of fourth user devices, respective fourth user account information; and
funding, based on the linking of the plurality of fourth user identifiers with the second white label merchant stored value account, the second white label merchant stored value account using the respective fourth user account information received from each of the plurality of fourth user devices.

16. The non-transitory machine-readable medium of claim 15, wherein the operations further comprise:
receiving, through the network, first user account information; and
funding, based on the linking of the first user identifier with the first white label merchant stored value account, the first white label merchant stored value account using the first user account information received from the first user devices.

17. The non-transitory machine-readable medium of claim 14, wherein the operations further comprise:
monitoring, based on the linking of the plurality of second user identifiers with the first white label merchant stored value account and subsequent to funding the first white label merchant stored value account with the respective first funding amounts, subsequent funding activity associated with each of the plurality of second user identifiers; and
unlinking, in the database based on the subsequent funding activity, at least some of the plurality of second user identifiers with the first white label merchant stored value account.

18. The non-transitory machine-readable medium of claim 14, wherein the operations further comprise:
receiving, through the network from at least one of the plurality of second user devices, funding timing information along with the respective second user account information; and
funding, based on the linking of the plurality of second user identifiers with the first white label merchant stored value account and in response to the funding timing information indicating that funding should occur during a current time period, the first white label merchant stored value account with the respective first funding amount using the respective second user account information received from the at least one of the plurality of second user devices that provided the funding timing information.

19. The non-transitory machine-readable medium of claim 14, wherein the operations further comprise:
receiving, through the network from at least one of the plurality of second user devices, reoccurring funding information along with the respective second user account information; and
funding, based on the linking of the plurality of second user identifiers with the first white label merchant stored value account and in response to the reoccurring funding information indicating that funding should occur during a current time period, the first white label merchant stored value account with a respective second funding amount using the respective second user account information received from the at least one of the plurality of second user devices that provided the reoccurring funding information.

20. The non-transitory machine-readable medium of claim 19, wherein the operations further comprise:
providing, through the network to the first user device in response to linking the first user identifier with the first white label merchant stored value account, a payment token;
receiving, through the network subsequent to the funding of the first white label merchant stored value account with the respective funding amounts, the payment token; and
completing, in response to receiving the payment token, a transaction using at least some of the respective funding amounts.

\* \* \* \* \*